United States Patent
Saishu et al.

(10) Patent No.: US 7,736,005 B2
(45) Date of Patent: *Jun. 15, 2010

(54) STEREOSCOPIC DISPLAY DEVICE AND METHOD

(75) Inventors: Tatsuo Saishu, Tokyo (JP); Yuzo Hirayama, Kanagawa-Ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 289 days.

This patent is subject to a terminal disclaimer.

(21) Appl. No.: 11/896,890

(22) Filed: Sep. 6, 2007

(65) Prior Publication Data

US 2008/0055547 A1    Mar. 6, 2008

Related U.S. Application Data

(62) Division of application No. 11/797,933, filed on May 9, 2007, which is a division of application No. 10/809,512, filed on Mar. 26, 2004, now Pat. No. 7,281,802.

(30) Foreign Application Priority Data

Mar. 28, 2003   (JP)   ............................. 2003-090738

(51) Int. Cl.
  *G03B 21/00*   (2006.01)
  *G03B 27/22*   (2006.01)
  *H04N 15/00*   (2006.01)
  *G09G 5/00*    (2006.01)

(52) U.S. Cl. .............................. 353/7; 359/463; 348/59; 345/5

(58) Field of Classification Search ...................... 353/7; 359/463, 462, 464, 466, 456, 458, 478, 479; 348/42, 51, 52, 56, 59, 6

See application file for complete search history.

(56) References Cited

U.S. PATENT DOCUMENTS

| 5,315,377 A | 5/1994 | Isono et al. |
| 2002/0101506 A1 | 8/2002 | Suzuki |
| 2003/0128871 A1* | 7/2003 | Naske et al. ................. 382/154 |

FOREIGN PATENT DOCUMENTS

JP    6-289320    10/1994

(Continued)

OTHER PUBLICATIONS

Notification of the First Office Action issued by the Chinese Patent Office on Mar. 7, 2008, for Chinese Patent Application No. 2004100855152, and English-language translation thereof.

(Continued)

*Primary Examiner*—Rochelle-Ann J Blackman
(74) *Attorney, Agent, or Firm*—Finnegan, Henderson, Farabow, Garrett & Dunner, L.L.P.

(57) ABSTRACT

In a one-dimensional IP (vertical disparity discarding system), it is made possible to obtain a perspective projection image with no distortion or reduced distortion. A stereoscopic display device is provided with a display device including a display plane in which pixels are arranged flatly in a matrix shape; and a parallax barrier including a plurality of apertures or a plurality of lenses and being configured to control directions of rays from the pixels such that a horizontal disparity is included but a vertical disparity is not included. A horizontal direction pitch of the parallax barrier is integer times a horizontal pitch of the pixels, the display plane of the display device is divided so as to correspond to elemental images for respective apertures or the lenses of the parallax barrier, and an image whose vertical direction corresponds to a perspective projection in a fixed viewing distance and whose horizontal direction corresponds to an orthographic projection is divided and arranged for respective columns of the pixels.

24 Claims, 20 Drawing Sheets

FOREIGN PATENT DOCUMENTS

| | | |
|---|---|---|
| JP | 8-262371 | 10/1996 |
| JP | 9-238369 | 9/1997 |
| JP | 2000-076481 | 3/2000 |
| JP | 2000-152285 | 5/2000 |
| JP | 2001-166259 | 6/2001 |
| JP | 2002-300611 | 10/2002 |

OTHER PUBLICATIONS

Notification of Reason for Rejection issued by the Japanese Patent Office on Jun. 20, 2006, for Japanese Patent Application No. 2003-090738, and English-language translation thereof.

U.S. Appl. No. 10/744,045, filed Dec. 24, 2003, to Fukushima et al., entitled "Three-Dimensional Image Display Apparatus, Method of Distributing Elemental Images to the Display Apparatus, and Method of Displaying Three-Dimensional Image on the Display Apparatus".

U.S. Appl. No. 10/386,492, filed Mar. 13, 2003, to Hirayama, entitled Three-Dimensional Display Apparatus.

U.S. Appl. No. 10/614,195, filed Jul. 8, 2003, to Hirayama, entitled "3D Image Reproduction Apparatus".

Final Report of "Advanced 3-D Tele-Vision Project," Section 2.8, Telecommunication Advancement Organization (TAO) of Japan (2002), pp. 87-118.

Hoshino et al., "Analysis of resolution limitation of integral photography," J. Optical Society of America (Aug. 1998), 15:2059-65.

Masuda, "Three Dimensional Display," Chapter 4, Sangyo Tosho (1990), pp. 69-83.

* cited by examiner

| m DIRECTION NUMBER | L=500 [mm] n RENDERING COMPUTATION COLUMN RANGE (APERTURE NUMBER) | | NUMBER OF COMPUTATION COLUMNS | L=1000 [mm] n RENDERING COMPUTATION COLUMN RANGE (APERTURE NUMBER) | | NUMBER OF COMPUTATION COLUMNS | L=1500 [mm] n RENDERING COMPUTATION COLUMN RANGE (APERTURE NUMBER) | | NUMBER OF COMPUTATION COLUMNS |
|---|---|---|---|---|---|---|---|---|---|
| | start | stop | | start | stop | | start | stop | |
| -27 | -298 | -290 | 9 | | | | | | |
| -26 | -298 | -274 | 25 | | | | | | |
| -25 | -298 | -258 | 41 | | | | | | |
| -24 | -299 | -243 | 57 | | | | | | |
| -23 | -299 | -227 | 73 | | | | | | |
| -22 | -299 | -211 | 89 | | | | | | |
| -21 | -299 | -196 | 104 | | | | | | |
| -20 | -299 | -180 | 120 | | | | | | |
| -19 | -299 | -165 | 135 | | | | | | |
| -18 | -299 | -149 | 151 | -299 | -297 | 3 | | | |
| -17 | -299 | -133 | 167 | -299 | -266 | 34 | | | |
| -16 | -299 | -118 | 182 | -299 | -235 | 65 | | | |
| -15 | -299 | -102 | 198 | -299 | -204 | 96 | | | |
| -14 | -299 | -86 | 214 | -299 | -172 | 128 | -299 | -258 | 42 |
| -13 | -299 | -71 | 229 | -299 | -141 | 159 | -299 | -211 | 89 |
| -12 | -299 | -55 | 245 | -299 | -110 | 190 | -299 | -165 | 135 |
| -11 | -290 | -40 | 251 | -299 | -79 | 221 | -299 | -118 | 182 |
| -10 | -274 | -24 | 251 | -299 | -47 | 253 | -299 | -71 | 229 |
| -9 | -258 | -8 | 251 | -299 | -16 | 284 | -299 | -24 | 276 |
| -8 | -243 | 8 | 251 | -300 | 16 | 316 | -300 | 24 | 324 |
| -7 | -227 | 24 | 251 | -300 | 47 | 347 | -300 | 71 | 371 |
| -6 | -211 | 40 | 251 | -300 | 79 | 379 | -300 | 118 | 418 |
| -5 | -196 | 55 | 251 | -300 | 110 | 410 | -300 | 165 | 465 |
| -4 | -180 | 71 | 251 | -300 | 141 | 441 | -300 | 221 | 511 |
| -3 | -165 | 86 | 251 | -300 | 172 | 472 | -300 | 258 | 558 |
| -2 | -149 | 102 | 251 | -297 | 204 | 501 | -300 | 300 | 600 |
| -1 | -133 | 118 | 251 | -266 | 235 | 501 | -300 | 300 | 600 |
| 1 | -118 | 133 | 251 | -235 | 266 | 501 | -300 | 300 | 600 |
| 2 | -102 | 149 | 251 | -204 | 297 | 501 | -300 | 300 | 600 |
| 3 | -86 | 165 | 251 | -172 | 300 | 472 | -258 | 300 | 558 |
| 4 | -71 | 180 | 251 | -141 | 300 | 441 | -211 | 300 | 511 |
| 5 | -55 | 196 | 251 | -110 | 300 | 410 | -165 | 300 | 465 |
| 6 | -40 | 211 | 251 | -79 | 300 | 379 | -118 | 300 | 418 |
| 7 | -24 | 227 | 251 | -47 | 300 | 347 | -71 | 300 | 371 |
| 8 | -8 | 243 | 251 | -16 | 300 | 316 | -24 | 300 | 324 |
| 9 | 8 | 258 | 251 | 16 | 299 | 284 | 24 | 299 | 276 |
| 10 | 24 | 274 | 251 | 47 | 299 | 253 | 71 | 299 | 229 |
| 11 | 40 | 290 | 251 | 79 | 299 | 221 | 118 | 299 | 182 |
| 12 | 55 | 299 | 245 | 110 | 299 | 190 | 165 | 299 | 135 |
| 13 | 71 | 299 | 229 | 141 | 299 | 159 | 211 | 299 | 89 |
| 14 | 86 | 299 | 214 | 172 | 299 | 128 | 258 | 299 | 42 |
| 15 | 102 | 299 | 198 | 204 | 299 | 96 | | | |
| 16 | 118 | 299 | 182 | 235 | 299 | 65 | | | |
| 17 | 133 | 299 | 167 | 266 | 299 | 34 | | | |
| 18 | 149 | 299 | 151 | 297 | 299 | 3 | | | |
| 19 | 165 | 299 | 135 | | | | | | |
| 20 | 180 | 299 | 120 | | | | | | |
| 21 | 196 | 299 | 104 | | | | | | |
| 22 | 211 | 299 | 89 | | | | | | |
| 23 | 227 | 299 | 73 | | | | | | |
| 24 | 243 | 299 | 57 | | | | | | |
| 25 | 258 | 298 | 41 | | | | | | |
| 26 | 274 | 298 | 25 | | | | | | |
| 27 | 290 | 298 | 9 | | | | | | |
| SUM | | | 9600 | | | 9600 | | | 9600 |

FIG. 3

|  | VERTICAL DISPARITY | AT TIME OF OUT-OF-VIEWING-ZONE IN FRONT AND REAR |
|---|---|---|
| BINOCULAR/ MULTIVIEW | NON | IMAGE DOES NOT LOOK STEREOSCOPIC (BREAKUP IMAGE) |
| 1-D IP | NON | IMAGE LOOKS STEREOSCOPIC BUT IS DISTORTED |
| 2-D IP | PRESENCE | IMAGE LOOKS STEREOSCOPIC AND DOES NOT INCLUDE DISTORTION |
| THIS EMBODIMENT | NON | IMAGE LOOKS STEREOSCOPIC AND DOES NOT INCLUDE DISTORTION SUBSTANTIALLY |

FIG. 5

STEREOSCOPIC DISPLAY DEVICE AND METHOD

CROSS-REFERENCE TO RELATED APPLICATIONS

This a divisional of application Ser. No. 11/797,933, filed May 9, 2007, which is a divisional of Ser. No. 10/809,512, filed Mar. 26, 2004 now U.S. Pat. No. 7,281,802, which claims priority of Japanese Patent Application No. 2003-90738, filed Mar. 28, 2003, all of which are incorporated herein by reference.

BACKGROUND OF THE INVENTION

1. Field of the Invention

The present invention relates to a stereoscopic display device and a stereoscopic display method.

2. Related Art

As a stereoscopic video image display device which allows display of a motion picture, a so-called three-dimensional display, ones of various systems have been known. In recent years, particularly, a display device of a flat panel type employing a system where dedicated eyeglasses or the like are not required is demanded highly. As a stereoscopic motion picture display device of such a type, there is known one using a principle of holography, which is difficult to be put in a practical use. A system where a beam controlling element is installed in front of a display panel (a display device) whose pixel positions are fixed, such as a liquid crystal display device, a plasma display device of a direct view type or a projection type is known as a system which can be realized relatively easily.

The beam controlling element is generally called a parallax barrier, and it has a structure that different images can be seen according to an angle change even at one or the same position. Specifically, in case of only a left and right disparity (a horizontal disparity), a slit or a lenticular sheet (or a lenticular plate) is used, and in case that an up and down disparity (a vertical disparity) is included, a pin hole or a lens array is used. The systems using the parallax barrier also are classified to a binocular system, a multiview system, an super multiview system (an super multiview condition of a multiview system) and an integral photography (hereinafter, abbreviated as IP). A basic principle common to these types is the same as that used in a stereoscopic photograph invented about a hundred years ago.

In a simplest binocular system, a certain viewpoint is defined, and a display panel and a parallax barrier are arranged such that different images are respectively seen at the right eye and the left eye of a viewer at the position of the defined viewpoint. A projection plane is provided on the beam controlling element at a distance from the viewpoint to the beam controlling element, and two perspective projection images having projection centers at the right eye and left eye positions are divided vertically for each pixel column and the respective divided pieces are arranged alternately in the display panel. Realization can be achieved relatively easily. In the binocular system, however, there are severe drawbacks that an image is not viewed stereoscopically at positions except for a defined position and a viewing zone is very narrow, that an image appears as a reversed stereoscopic view (pseudoscopy), namely, an abnormal image such that a depth are viewed in a reversed manner when the image is seen at a position moved by a interpupilliary distance (IPD) in left and right directions. There is an advantage that switching between a two-dimensional display and a three-dimensional display can also be performed easily, but application of the binocular system is only an easy application such as a small-sized display.

In order to broaden the narrow viewing zone substantially, a method where the pseudoscopy of the binocular type is avoided by a viewpoint tracking or a head tracking technique has been proposed. As examples of the method, there are a method which switches left and right parallax images from each other, and a method which moves a lenticular sheet in front and rear directions and in left and right directions. Further, a method where an indicator for confirming whether or not an image is out of the viewing zone is provided separately below a screen or around it has been known. In the case of the binocular system, the indicator can allow detection of front and rear and left and right directions. As an example of a viewpoint tracking technique for expanding an effective viewing zone, there has been known an example where an image is changed with a fixed viewpoint according to change in elevation angle of a screen, or an example where a screen angle is tracked (a screen is rotated on a horizontal axis) at a time of viewpoint movement and an image is also changed. There is also an example where the parallax barrier system is not employed but adjustment of a disappearing point of a transparent image, a view line detection/a perspective transformation, and an zooming-in/out are conducted.

In the multiview system, the number of parallax is increased from four to about eight so that the number of positions where an image appears normally is increased. In case that a viewer moves laterally to change his/her viewing angle, he/she sees different images depending on an angle from a stereoscopic display (motion parallax). However, an image which is not continuous but "flipping" appears after a blackout where an angle changes quickly. Further, in the multiview system, the problem about the pseudoscopy still remains.

The super multiview system is constituted such that a parallax image is divided very finely independent of IPD and beams comprising a plurality of parallax images enter in the pupil of a viewer. Thereby, the flipping is cancelled and a more natural image can be obtained. However, since an amount of image information to be processed increases by leaps and bounds as compared with the multiview system, which results in difficulty in realization.

In the multiview system or the super multiview system, there occurs a case of including not only a horizontal disparity but also a vertical disparity. In such a system, however, since the amount of image information to be processed increases by leaps and bounds, it is difficult to realization the system.

The integral photography system (IP system) may be called "integral videography system (IV system)", "integral imaging system (II system)" or the like, but it is a system which utilizes a lens (a fly's eye lens) similar to a compound eye of an insect as a parallax barrier to arrange elemental images corresponding to respective lenses behind the lenses and perform displaying, where a completely continuous motion parallax can be achieved without including the flipping and beams approximating to a real material in a horizontal direction/in a vertical direction/in an oblique direction can be reproduced. This system is an ideal system which allows a normal stereoscopic view even if a viewer turns his/her face sidelong or obliquely. It is desirable that the elemental image comprises continuous pixels which are not discrete pixels of finite size. However, even if the elemental image is constituted with a collection of discrete pixels such as liquid crystal display panels, a continuous motion parallax with a level which causes no problem practically can be obtained by using pixels with a high fineness of a pixel pitch.

In the IP system which also includes a vertical disparity, namely, a two-dimensional IP system, however, since the amount of image information to be processed increases by leaps and bounds it is difficult to realize such a system. On the other hand, in a one-dimensional IP system which is the IP system where the vertical disparity has been cancelled, since a continuous motion parallax in a horizontal direction can be obtained, a stereoscopic view with a high display quality can be achieved as compared with the binocular system or the multiview system, and the amount of image information to be processed can be reduced as compared with the super multiview system.

The IP system has a viewing zone in front and rear directions boarder than the multiview system, but the one-dimensional IP system has a viewing zone in front and rear direction narrower than the two-dimensional IP system. Since there is no vertical disparity in the one-dimensional IP system, a perspective projection image is displayed on the assumption of a certain viewing distance in a vertical direction. Accordingly, an image is distorted except for a determined viewing distance (in a range including the distance to some extent in front and rear directions) and a correct three-dimensional image can not be obtained. As a result, it is not recognized that there is a large difference between the one-dimensional IP system and the multiview system in a viewing zone in front and rear direction.

The multiview system is the same as the one-dimensional IP system in a point that there is no parallax in a vertical direction. However, the viewing zone in front and rear directions is originally narrow in the multiview system, which does not constrain the viewing zone. In case that the number of parallaxes is as many as about sixteen in the multiview system, the region in the front and rear directions which is out of viewing distance in the multiview system is substantially the same as the one-dimensional IP system, though an image is distorted. That is, this means that a special version of the one-dimensional IP system is the multiview system. In the two-dimensional IP system, since a three-dimensional image of a correct perspective projection is seen in a vertical direction and in a lateral direction according to a viewing distance, no distortion occurs, which results in that the two-dimensional IP system has a viewing zone in the front and rear directions broader than the one-dimensional IP system or the multiview system.

The one-dimensional IP system where the elemental image is constituted with discrete pixels includes the multiview system by definition. That is, of the one-dimensional IP systems, such a special case that the elemental image comprises pixels of a relatively small number of integer pixel columns, a lens accuracy is high (namely, the m-th specific pixel of n parallaxes can securely be seen from any aperture), and a converging (condensing) interval of light beams (crossing lines between a plane connecting the pixel column and a viewing distance plane) is equal to an IPD (62 mm to 65 mm) is the multiview system. Here, a position of a viewpoint (a single-eye) is fixed to a reference position, and a difference in column number between a pixel viewed from an aperture just from the front and a pixel viewed from an aperture adjacent thereto is defined as a pixel column number per elemental image (which may be a fraction instead of an integer) (for example, refer to J. Opt. Soc. Am. A vol. 15, p. 2059 (1998)). A pitch of the elemental image is determined according to an interval between slit centers projected from a viewpoint on to a pixel plane of display panel, but it is not determined from a pixel pitch itself on a display panel.

In the multiview system, pixel centers in a display panel must be positioned on an extension line of both the eyes and all apertures (for example, a slit), so that a high design precision is required. When the eye position is shifted leftward or rightward, it moves at a position where a light shielding portion (a black matrix) between respective pixels can be seen, and when the position is further shifted, an adjacent pixel can be seen (flipping).

On the other hand, in the one-dimensional IP system, a pixel on the display panel can be seen or a black matrix can be seen, or different positions of each pixel can be seen on an extension line of both the eyes and each aperture. An aperture pitch and a pixel width have no relation to each other (ideally, a display which has no pixel such as a photograph is assumed), and a very high design precision is not required. Even if the eye position is deviated, a ratio between pixels where an opening is seen and pixels where a black matrix is seen is not changed so that a flipping does not occur. In this connection, since the aperture pitch when seen from the eye position does not meet integer times the pixel pitch, moire may be seen in case that a black matrix can not be ignored particularly by using a slit.

The one-dimensional IP system which is handled in this specification does not include the multiview system. The definition of the one-dimensional IP system except the multiview system lies in a point that the number of pixel columns in an elemental image is not integer (or a large number which can be assumed to be infinite, and fine), even if there is a position where the pixel columns and a plane connecting apertures forms a crossing line to converge, the converging interval is not equal to an IPD (62 mm to 65 mm) and is different from the viewing distance. In the multiview system, the left and right eyes view adjacent pixel columns, and in the super multiview system, they view pixel columns which are not adjacent to each other. In the IP system, the eyes may view pixel columns which may be adjacent to each other or not. This is because a continuous image where no pixel is within an elemental image is originally supposed in the IP system. Even in either the multiview system or the IP system, when a pixel column group (elemental image) cycle and a pupil (aperture of lens or slit) cycle are compared with each other in a correct design, the latter is shorter than the former without any exception. Incidentally, in extreme conditions unrelated with the practical use, such as a case that the viewing distance is infinite, a case that a screen is infinitely small or the like, the both are identical.

In case that the slit and the display panel are close to each other and the viewing distance is relatively far, the both take values approximating to each other. For example, in case that the viewing distance is 1 m, the slit pitch is 0.7 mm, and a gap which is a distance between the slit and the pixel plane of the display panel is 1 mm, the pixel group cycle becomes 0.7007 mm, which is longer than the slit pitch by 0.1%. Assuming that the number of pixels in the lateral direction is 640, the full width of the slit and the full width of the pixel display portion are deviated from each other by 0.448 mm. Since the deviation is relatively small, even if the pixel group cycle and the pupil cycle are designed to be equal to each other, an image is seen normally at a glance, in case that an image appears only around a central portion (for example, both end portions have a solid color background), or in case that, though a screen size is small, the viewing distance is long. However, the 3-D image can not be seen correctly up to both ends of the screen.

As described above, even in either the multiview system or the IP system, when the elemental image cycle (pitch) and the aperture cycle (pitch) are compared with each other in a correct design, there is a slight difference between the both such as 0.1% or so, but the latter is shorter than the former without any exception. In some literatures or documents lacking in theoretical strictness, there is a description that the both are identical to each other, but these descriptions are erroneous. Further, there are some literatures which are thought to describe that the both pitches are identical to each other in such a meaning as a case that an image has been seen by an eye (a perspective projection centering the position of the eyes), namely, in such a meaning that, since the pupil is positioned on this side of the elemental image, actually different pitch is seen as the same pitch. In general, a difference between the IP system and the LS (lenticular sheet) system is considered to be a difference whether pixels exist on an image plane or they exist on a focal plane. However, in an actual design, and in particular in case that the number of pixels is numerous, a difference between the image plane and the focal plane is 0.1 mm or less, even if there is no aberration. Therefore, it is difficult to discriminate between the image plane and the focal plane regarding the precision and it is also difficult to make discrimination about whether there is presence or absence of convergence of beams in the viewing distance. The IP system in this specification indicates such a constitution that discrimination is not made on the basis of the positions of the image plane and the focal plane and that a viewpoint position in a lateral direction where a normal stereoscopic image can be seen in the viewing distance is arbitrary (continuous). Further, the multiview system in the present specification is not equivalent to the LS system (irrespective of presence/absence of convergence of beams), and it indicates such a constitution that a viewpoint position in a lateral direction where a normal stereoscopic image can be seen in the viewing distance is defined on the basis of an IPD.

Since the viewing distance is generally finite even in either the IP system or the multiview system, a display image should be produced such that a perspective projection image in the viewing distance can be seen actually. It is a usual method to produce a perspective projection image for each crossing point (crossing line) between a line (plane) connecting pixels (a pixel column) and a slit, and a viewing distance plane. In the case of the multiview system, the number of crossing lines between the pixel column and the slit is converged to 16, if the number of viewpoints in the multiview system is 16. Therefore, 16 perspective projection images (all faces) must be produced.

In an ordinary IP system, since convergence of beams does not occur at the viewing distance, perspective projection images (each may be one pixel column instead of all the faces) regarding all pixel column number must be produced. It is thought that, when a computation program is created skillfully, the amount of computation itself is not so difficult from that in the multiview system, but a procedure for creation of the program becomes very complicated. Incidentally, in a special case included in the IP where the slit pitch becomes integer times (for example, 16 times) the pixel pitch (even in this case, the pitch of the elemental image is longer than the slit pitch and it is not integer times the pixel pitch), when a display image is produced by producing 16 orthographic projection images and distributing them for respective pixel columns, a perspective projection image can be seen in a horizontal direction as actually viewed from a viewpoint.

However, an image appearing in this producing method results in a perspective projection in a horizontal direction and an orthographic projection in a vertical direction. Here, a method where the perspective projection is made on a fixed plane along lines converging to one point (a viewpoint, a projection center point) and the orthographic projection is made on a fixed plane along parallel lines which do not converge is employed. However, in the "horizontally-perspective/vertically-orthographic projection", projection is made on a fixed plane along such lines as converging to one vertical line (which converge in a horizontal direction but does not converge in a vertical direction). In the one-dimensional IP, since a perspective projection image corresponding to the viewing distance can be obtained in the horizontal direction but a vertical disparity is cancelled, a perspective projection image must be displayed on the assumption of a certain viewing distance in the vertical direction.

Accordingly, when the vertical direction and the horizontal direction are combined, there occurs a problem that an image is distorted except for a predetermined viewing distance. In the binocular system or the multiview system, when an image is out of the viewing zone in a front or rear direction, the image becomes a breakup image so that it does not appear to be stereoscopic. On the other hand, in the one-dimensional IP, there is a merit that a front and rear range where an image appears to be stereoscopic is wide, but this merit can not be eventually utilized sufficiently due to distortion occurrence. A precedent has not been found that the projection method or the front and rear viewing distance for an original image in the one-dimensional IP was discussed strictly.

In this connection, in case that an image is photographed as an actual image, which is different from a case that a projection image is produced from a computer graphics, it becomes necessary to simultaneously photograph the image by a camera with a multi-viewpoint and perform such processings as an interpolation, an image conversion or the like.

A method where a convex flexible display plane which is a multiview system is provided, the display plane and a lens are positioned at the same curvature center and the curvature center is set at a position of the head according to detection of the head is disclosed (refer to, for example, JP06-289320A).

As described in detail, since there is not a vertical disparity in the one-dimensional IP system, there occurs a problem that a perspective projection image in a vertical direction must be displayed on the assumption of a certain viewing distance and the image is distorted except for at the distance.

SUMMARY OF THE INVENTION

The present invention has been made in view of the above circumstances and an object thereof is to provide a stereoscopic display device which can obtain a correct perspective projection image which has no distortion or has a reduced distortion in one-dimensional IP system (a vertical disparity discarding system).

A stereoscopic display device of a one-dimensional integral photography system according to a first aspect of the present invention includes: a display unit including a display plane in which pixels are arranged flatly in a matrix shape; and a parallax barrier including a plurality of apertures or a plurality of lenses and being configured to control directions of rays from the pixels such that a horizontal disparity is included but a vertical disparity is not included, a horizontal direction pitch of the parallax barrier being integer times a horizontal pitch of the pixels, the display plane of the display unit being divided so as to correspond to elemental images for respective apertures or the lenses of the parallax barrier, and an image subjected to a perspective projection in a fixed viewing distance in a vertical direction and subjected to an orthographic projection in a horizontal direction being divided and arranged for respective columns of the pixels.

A stereoscopic display device of a one-dimensional integral photography system according to a second aspect of the present invention includes: a display unit including a display plane in which pixels are arranged flatly in a matrix shape; a parallax barrier including a plurality of apertures or a plurality of lenses and being configures to control directions of rays from the pixels such that a horizontal disparity is included but a vertical disparity is not included; and a viewing distance adjusting function which changes a vertical direction perspective projection image according to change in viewing distance, the display plane of the display unit being divided so as to correspond to elemental images for respective apertures or the lenses of the parallax barrier.

A stereoscopic display device of a one-dimensional integral photography system according to a third aspect of the present invention includes: a display unit including a display plane in which pixels are arranged flatly in a matrix shape; a parallax barrier including a plurality of apertures or a plurality of lenses and being configured to control directions of rays from the pixels such that a horizontal disparity is included but a vertical disparity is not included; and a detecting mechanism configured to detect an out-of-viewing zone to the display plane in up and down or front and rear directions, the display plane of the display unit being divided so as to correspond to elemental images for respective apertures or the lenses of the parallax barrier.

A stereoscopic display device of a one-dimensional integral photography system according to a fourth aspect of the present invention includes: a display unit including a display plane in which pixels are arranged flatly in a matrix shape; and a parallax barrier including a plurality of apertures or a plurality of lenses and being configured to control directions of rays from the pixels such that a horizontal disparity is included but a vertical disparity is not included, the display plane of the display unit being divided so as to correspond to elemental images for respective-apertures or the lenses of the parallax barrier, and the display plane of the display unit being formed in a shape of a curved face in a vertical direction, and the a perspective projection image in a vertical direction where the center point determined from the radius of curvature of the curved face is defined as a viewing distance position being displayed on the display plane.

A stereoscopic display method of a one-dimensional integral photography system according to a fifth aspect of the present invention includes: displaying pixels in a display plane which are arranged flatly in a matrix shape; and controlling directions of rays from the pixels such that a horizontal disparity is included but a vertical disparity is not included by a parallax barrier including a plurality of apertures or a plurality of lenses; a horizontal direction pitch of the parallax barrier being integer times a horizontal pitch of the pixels, the display plane of the display unit being divided so as to correspond to elemental images for respective apertures or the lenses of the parallax barrier, and an image subjected to a perspective projection in a fixed viewing distance in a vertical direction and subjected to an orthographic projection in a horizontal direction being divided and arranged for respective columns of the pixels.

BRIEF DESCRIPTION OF THE DRAWINGS

FIG. 3 is a table showing assignment to pixels in a orthographic projection direction used as a lookup table in the display image producing procedure illustrated in FIG. 2 or FIG. 19;

FIG. 5 is a table showing comparison with another system;

DESCRIPTION OF THE EMBODIMENTS

Embodiments of the present invention will be explained in detail below with reference to the drawings. These embodiments are described for easy understanding of the present invention. The embodiments may be modified variously within the scope or spirit of the present invention and the present invention is not limited to these embodiments.

First Embodiment

Figure 1:
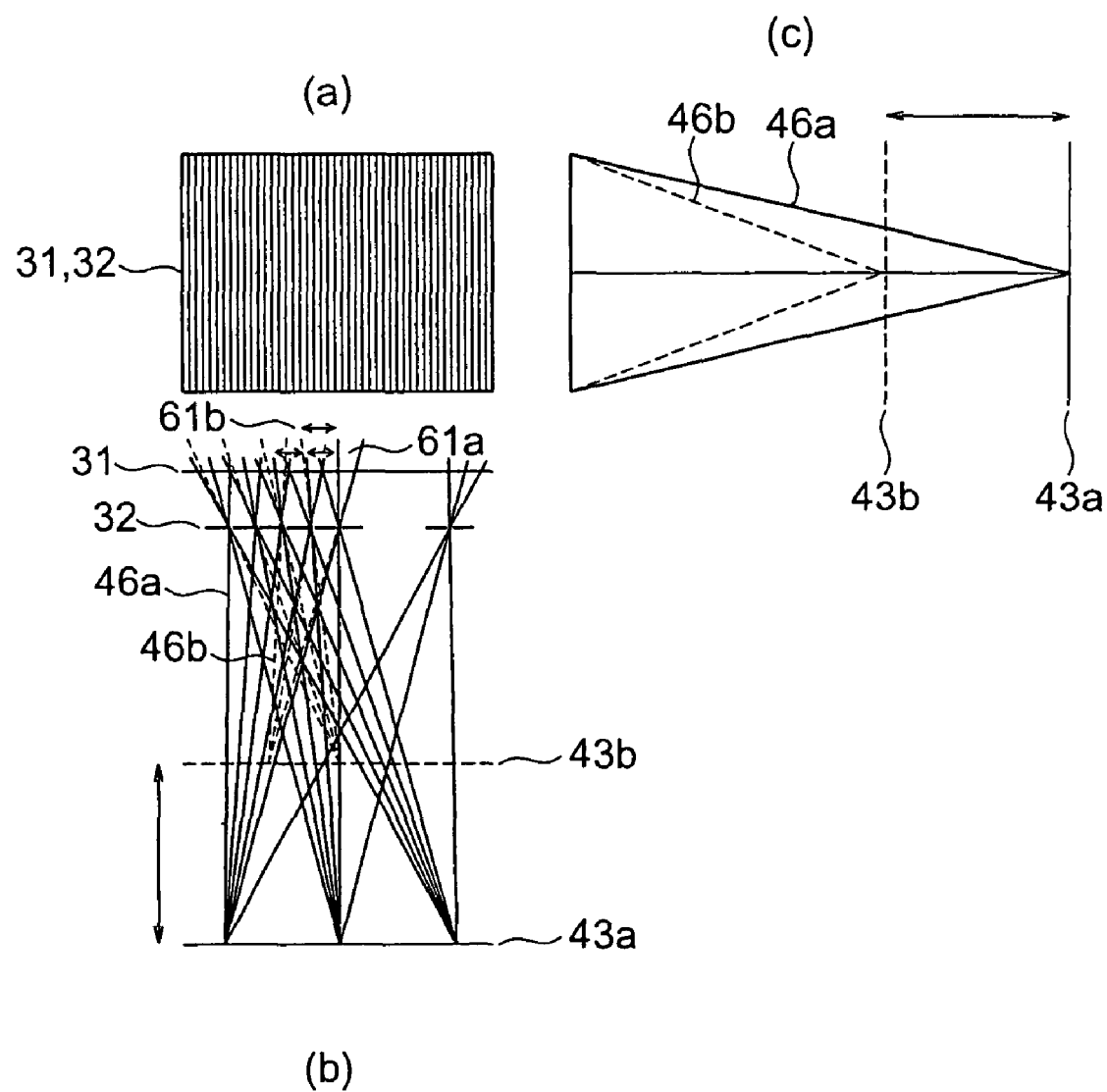
FIG. 1 are views illustrating an image arranging method of a stereoscopic display device according to a first embodiment of the present invention, FIG. 1(a) being a front view of a liquid crystal display panel and a parallax barrier according to the first embodiment, FIG. 1(b) being a plan view illustrating an image arrangement according to the first embodiment and FIG. 1(c) being a side view illustrating the image arrangement of the stereoscopic device according to the first embodiment.
Figure 4:
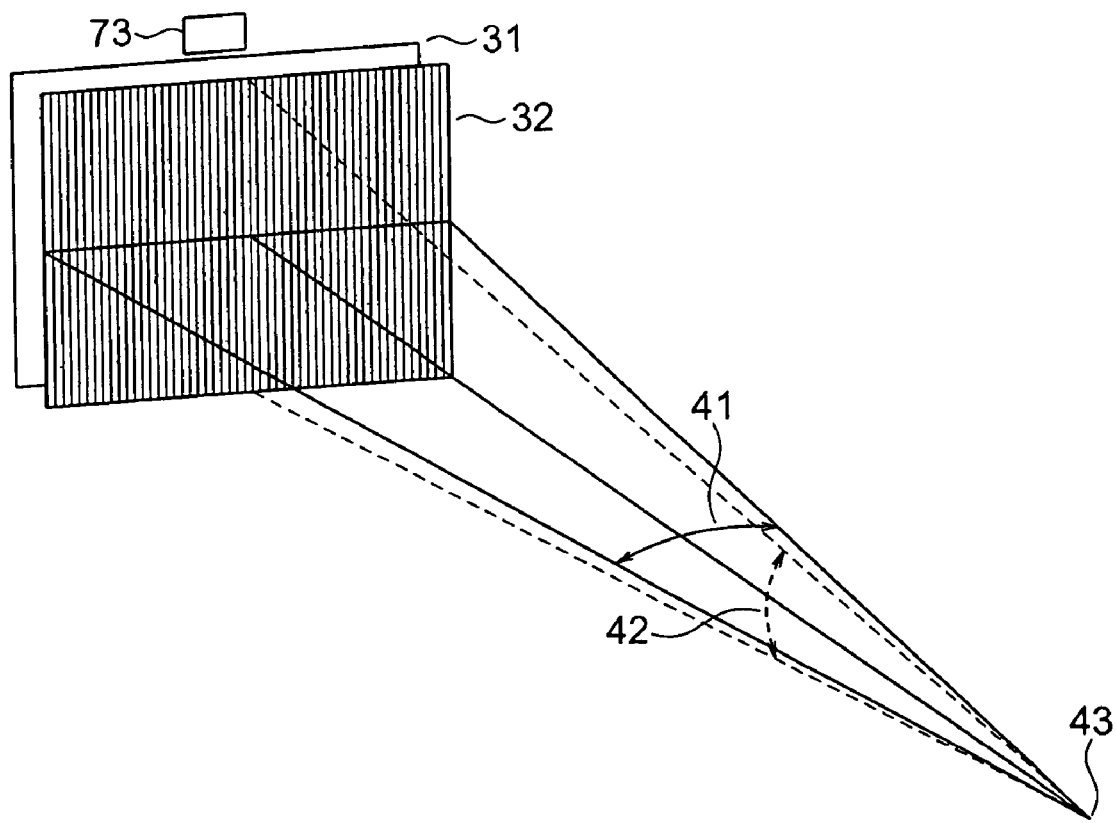
FIG. 4 is a view illustrating the stereoscopic display device used in the first embodiment of the present invention.

A stereoscopic display device according to the first embodiment of the present invention will be explained with reference to FIG. 1 to FIG. 12. The stereoscopic display device according to this embodiment is provided with a liquid crystal panel 31 serving as a flat display device and a parallax barrier 32, as illustrated in FIG. 1 and FIG. 4. FIG. 1(a) is a front view of the liquid crystal panel 31 and the parallax barrier 32, FIG. 1(b) is a plan view illustrating an image arrangement of a stereoscopic display device according to the embodiment, and FIG. 1(c) is a side view illustrating the image arrangement of the stereoscopic display device according to the embodiment. FIG. 4 is a transmission view illustrating the image arrangement of the stereoscopic display device according to the embodiment.

As far as the display device 31 is constituted such that pixels whose positions are defined within a display plane are arranged flatly in a matrix manner, it may be any one of a liquid crystal display device of a direct view type or a projection type, a plasma display device, a display device of a field emission, an organic EL display device and the like. In this embodiment the display device used is of the direct view type where a diagonal size is 20.8 inches, the number of pixels is 3,200 in a horizontal direction and 2,400 in a vertical direction, each pixel is divided lengthwise into 3 sub-pixels of red, green and blue (RGB), and the pitch of the sub-pixel is 44 μm.

Figure 12:
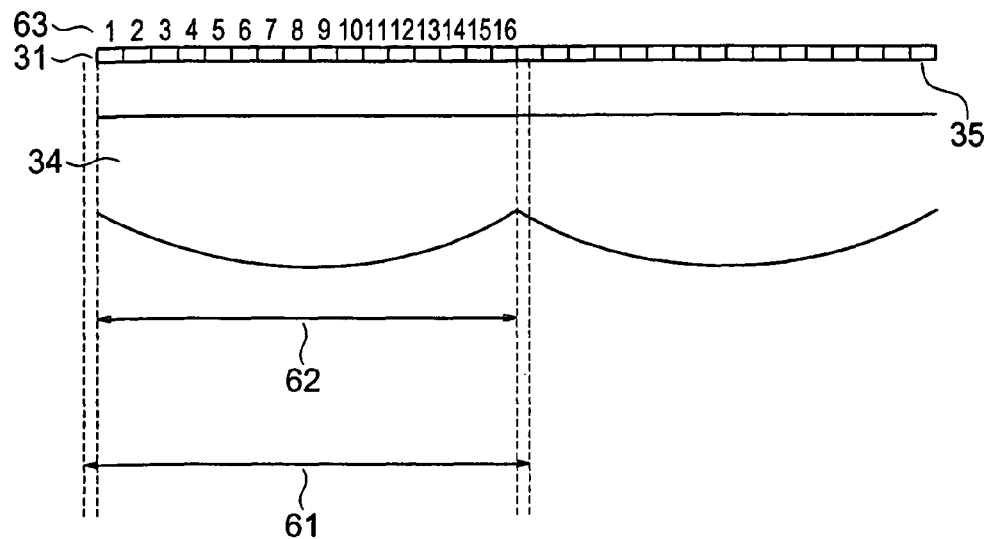
FIG. 12 is a diagram showing a positional relationship among pixels, an elemental image and a parallax barrier in an integral photography system according to the first embodiment of the present invention.

As the parallax barrier 32, a slit or a lenticular sheet (a cylindrical lens array) 34 extending in a substantially vertical direction and having a cyclic structure in a substantially horizontal direction, as illustrated in FIG. 12, where a pitch (cycle) in a horizontal direction is 0.704 mm corresponding to 16 sub-pixels. In this connection, FIG. 12 is a view illustrating a positional relationship among pixels, an elemental image and a parallax barrier in the integral photography system according to this embodiment. In FIG. 12, reference numeral 31 denotes a liquid crystal panel, reference numeral 61 denotes an elemental image width (pitch), reference numeral 62 denotes a lens pitch, and reference numeral 63 denotes a number of a parallax image. A gap between a display plane (an inner plane between glass substrates) of the liquid crystal panel 31 which is the display device and the parallax barrier 32 is effectively set to about 2 mm considering refractive indexes of the glass substrate or the lens material. That is, a lenticular sheet with a thickness of about 3.1 mm corresponds to a gap of 2 mm in a case of a slit having the same parallax image arrangement, because a beam (principal ray) direction is refracted outside and inside the lens.

One where not a pitch appearing due to a difference in a distance in the eye of a viewer but an actual pitch of the parallax barrier 32 is integer times the pixel pitch is not a multiview but a one-dimensional integral photography, as described above. The arrangement illustrated in FIG. 12 is not classified to a multiview, because in this arrangement a viewing distance where beams converge to approach to 17 view system is about 32 mm, which is impossible practically, and a converging interval is not equal to an IPD, and beams do not converge in any other viewing distances. The one-dimensional integral photography, as illustrated in FIG. 4, shows disparity only in a horizontal direction 41, and an image changes according to a viewing distance, but it does not show disparity in a vertical direction 42 and a fixed image can be obtained regardless of the viewing distance. In this connection, reference numeral 73 in FIG. 4 denotes a viewing distance sensor (an observer position detector) used in the second embodiment described later.

Figure 10:
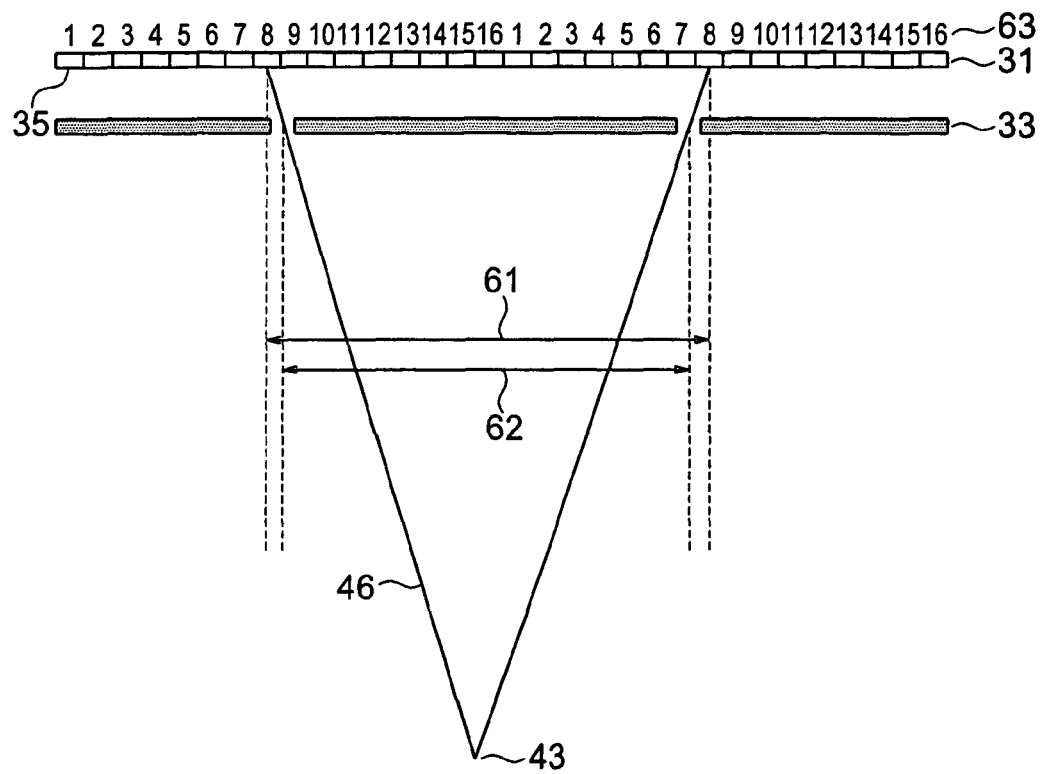
FIG. 10 is a diagram showing a positional relationship among pixels, an elemental image and a parallax barrier in a binocular system or a multiview system.
Figure 11:
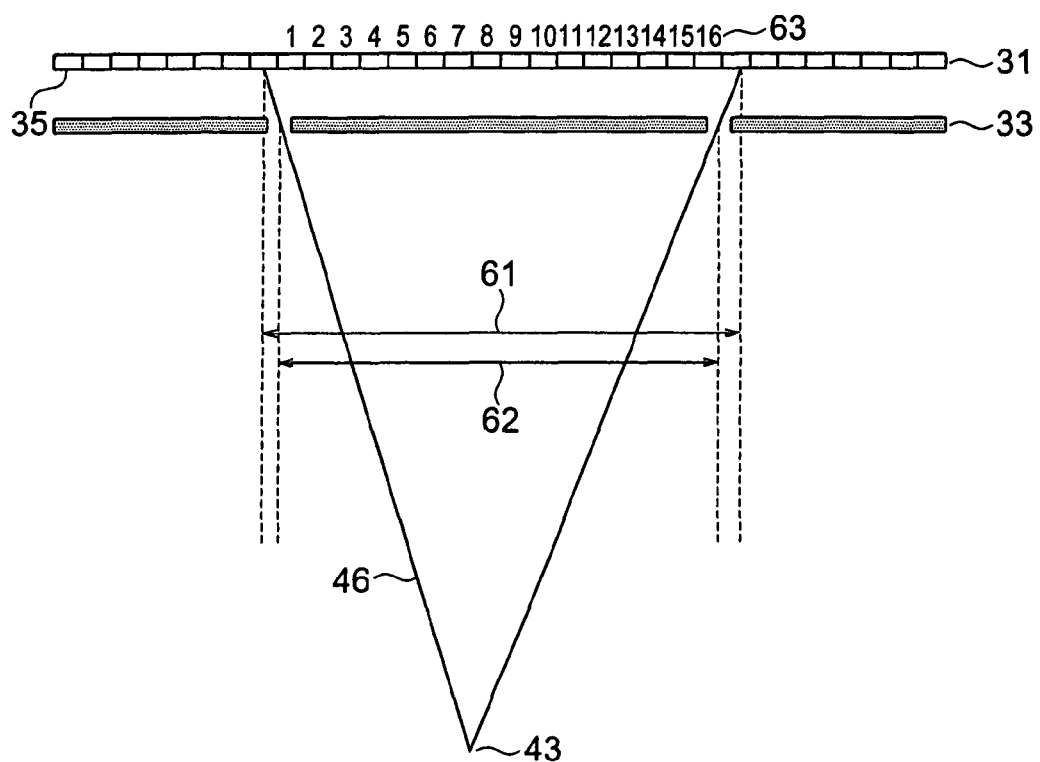
FIG. 11 is a diagram showing a positional relationship among pixels, an elemental image and a parallax barrier in an integral photography system.

In FIG. 1, when a viewing distance plane is defined as a flat face 43a or a flat face 43b, a pitch 61a or a pitch 61b of the elemental image is determined according to an interval of aperture centers projected on a pixel plane on the display panel 31 from viewpoints on the visual distance plane 43a or the 43b as described above. Reference numerals 46a and 46b denote lines connecting the viewpoint position and the aperture centers, which do not pass through the centers of pixels in the one-dimensional IP necessarily, as illustrated in FIG. 11 and FIG. 12. On the other hand, the connecting lines pass through the centers of pixels 35 in the multiview system, as illustrated in FIG. 10, and the line 46 connecting the viewpoint position 43 and the aperture center is coincident with a beam. Incidentally, FIG. 10 is a view illustrating a positional relationship among pixels, an elemental image and a parallax barrier (the slit 33) of a binocular or a multiview system.

In this embodiment, since a horizontal pitch of the aperture is integer times the pixel, a pitch 61 of the elemental image becomes a number deviated from the integer times of the pixel 35, as illustrated in FIG. 12. In this connection, even if a horizontal pitch 62 of the aperture is not integer times the pixel, the pitch 61 of the elemental image generally becomes a number deviated from the pixel in the one-dimensional integral photography, which is illustrated in FIG. 11. FIG. 11 is a view illustrating a positional relationship among pixels, an elemental image and a parallax barrier (the slit 33) in the integral photography system. On the other hand, in the multiview system, the pitch 61 of the elemental image is integer times a pixel as illustrated in FIG. 10.

Figure 2:
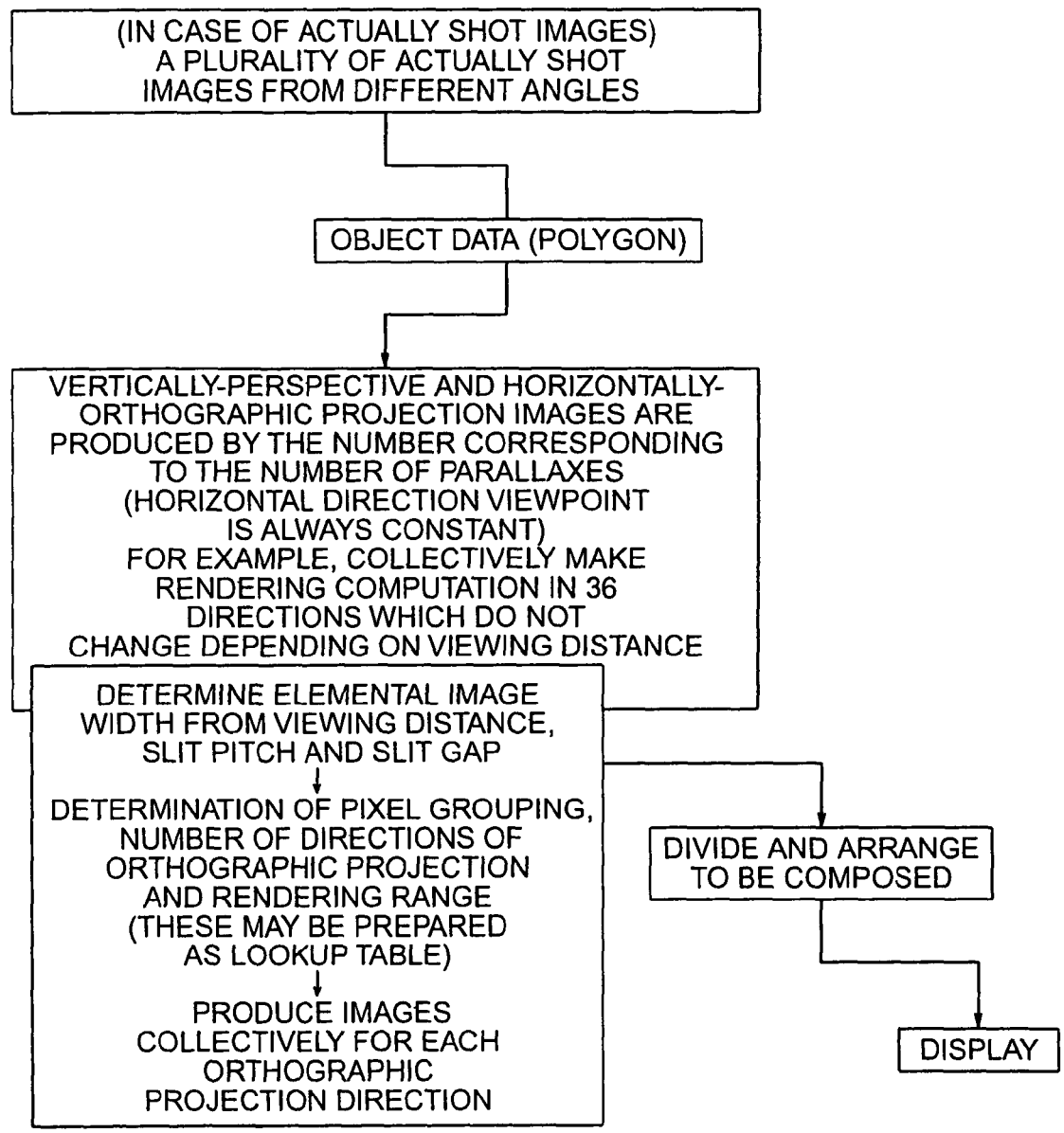
FIG. 2 is a flowchart showing a display image producing procedure according to the first embodiment.

A display image producing procedure of the stereoscopic display device according to the embodiment is illustrated in FIG. 2. In case of a computer graphics, there is provided object data (polygon), and in case of a actually shot images, a plurality of shot images from different angles (a crossing type multi-viewpoint camera) or different positions (a parallel type multi-viewpoint camera) is converted to object data. The converting method has been described, for example, in Final Report of "Advanced 3-D Tele-Vision Project" by the Telecommunication Advancement Organization (TAO) of Japan issued September, 2002 (Section 2.8 and the like). Vertically-perspective and horizontally-orthographic projection images are produced by the number of parallaxes. In case of a viewing distance of 1 m, all 9,600 columns are collectively computed in orthographic projections in 36 directions.

A grouping of pixels in specific 36 directions is shown in a center column (in case of viewing distance L=1000 mm) in FIG. 3. FIG. 3 is a table illustrating assignment to pixels in an orthographic projection direction, which is used as a lookup table in the display image producing procedure. Incidentally, in FIG. 3, the left side column shows a case that the viewing distance L is 500 mm and the right side column shows a case that the viewing distance L is 1500 mm. Since the number of orthographic projection directions and a computation range are determined by determining the viewing distance, such a fact can be made in a lookup table in advance. An orthographic projection image is produced by rendering and texture mapping according to such a method as a ray-tracing and it is divided and arranged in respective columns for 36 directions to be composed, so that a display image is completed.

Figure 17:
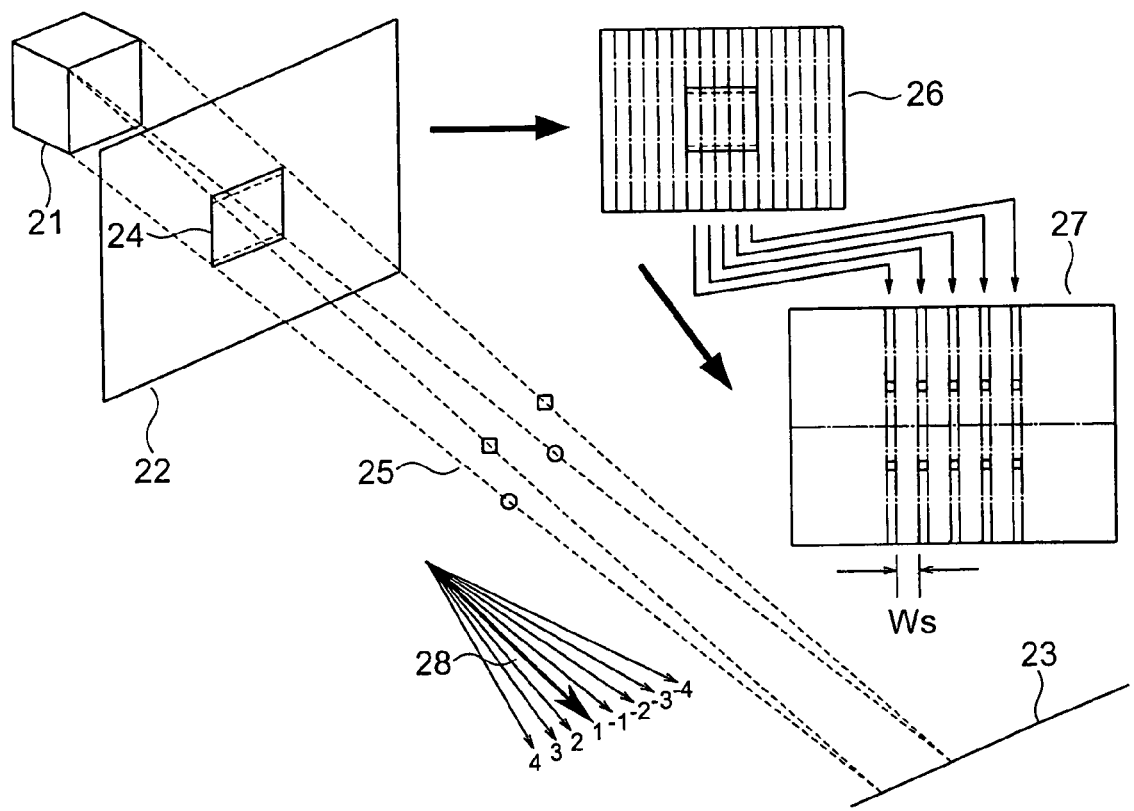
FIG. 17 is a diagram illustrating an image projection method and an image arrangement method of the stereoscopic display device according to the first embodiment of the present invention.

The procedure illustrated in FIG. 2 will be explained specifically below with reference to FIG. 17. An object (subject) 21 to be displayed is projected on a projection plane 22 which is positioned at the same position as the display plane to be actually displayed in the plane of lenticular plate by the liquid crystal panel to form an image 24. At this time, the object is projected along projection lines 25 extending toward a projection-center line 23 which is parallel to the projection plane 22 at a front face (the center in a vertical direction) and is positioned within a viewing distance plane such that a vertical direction corresponds to a perspective projection and a horizontal direction corresponds to an orthographic projection. The projection lines 25 do not cross one another in a horizontal direction but they cross one another in a vertical direction at the projection-center line 23. The vertically-perspective and horizontally-orthographic projection image 24 of the subject is produced on the projection plane by the projection method.

This method is the same as a rendering operation in a commercially available three-dimensional computer graphics producing software except that there is a difference in projection process between a vertical direction and a horizontal direction. In the three-dimensional computer graphics producing software, if such a camera that a perspective projection is performed in a vertical direction and an orthographic projection is performed in a horizontal direction is defined, this projection method can be performed easily. Specifically, a camera combined such that a horizontal direction (x-axis) takes an output form of an orthographic projection camera and a vertical direction (y-axis) takes an output form of a perspective projection can be defined. An image (parallax image) 26 corresponding to one direction where a perspective projection and a orthographic projection have been respectively performed in a vertical direction and a horizontal direction on the projection plane 22 is divided for each one pixel column in a vertical direction and these divided pixel columns are arranged on the pixel plane 27 of the display device at intervals of aperture pitch Ws (at intervals of pixel columns comprising a fixed number of pixels). The above operation is repeated regarding the other projection directions 28 so that the entirety of the pixel plane 27 is completed. As the projection directions 28, only 8 directions of −4, −3, −2, −1, 1, 2, 3, 4 are illustrated in FIG. 17, but several tens directions will be required according to the viewing distance. Each projection direction corresponds to a parallax number, but respective directions are set such that they do not have equal angles but form equal intervals on the viewing distance plane (the projection-center line). That is, parallel translation (orientation is fixed) of a camera is performed on the projection-center line at equal intervals. Each of the projected images 26 may be produced with only columns positioned in a required range, and the required range is shown in a table in FIG. 3.

Figure 21A:
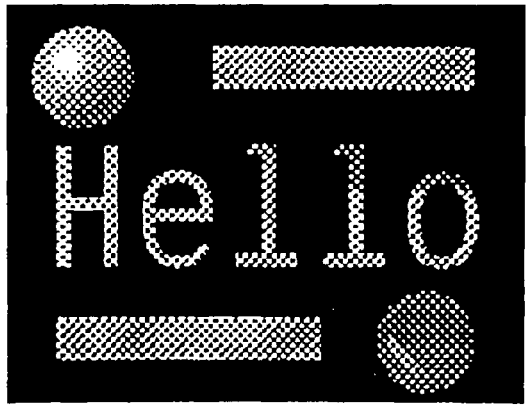
FIG. 21A to FIG. 21D are photographs showing a projection view produced according to a projection method according to an embodiment of the present invention and projection views produced according to other projection methods.
Figure 21B:
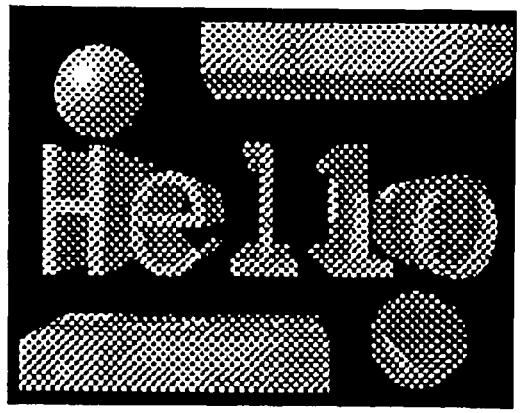
Figure 21C:
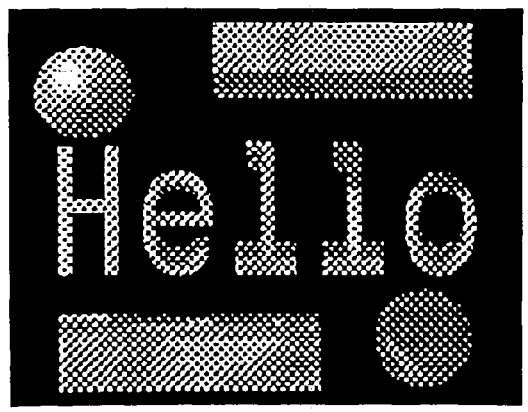
Figure 21D:
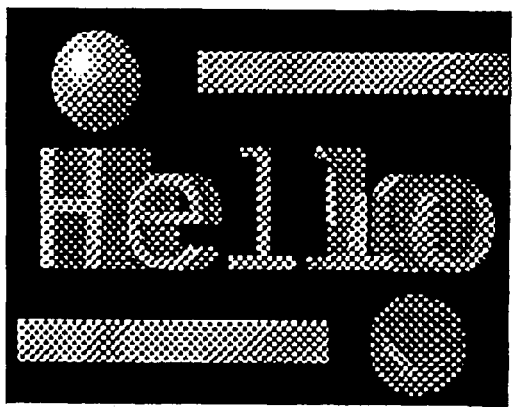
Figure 22:
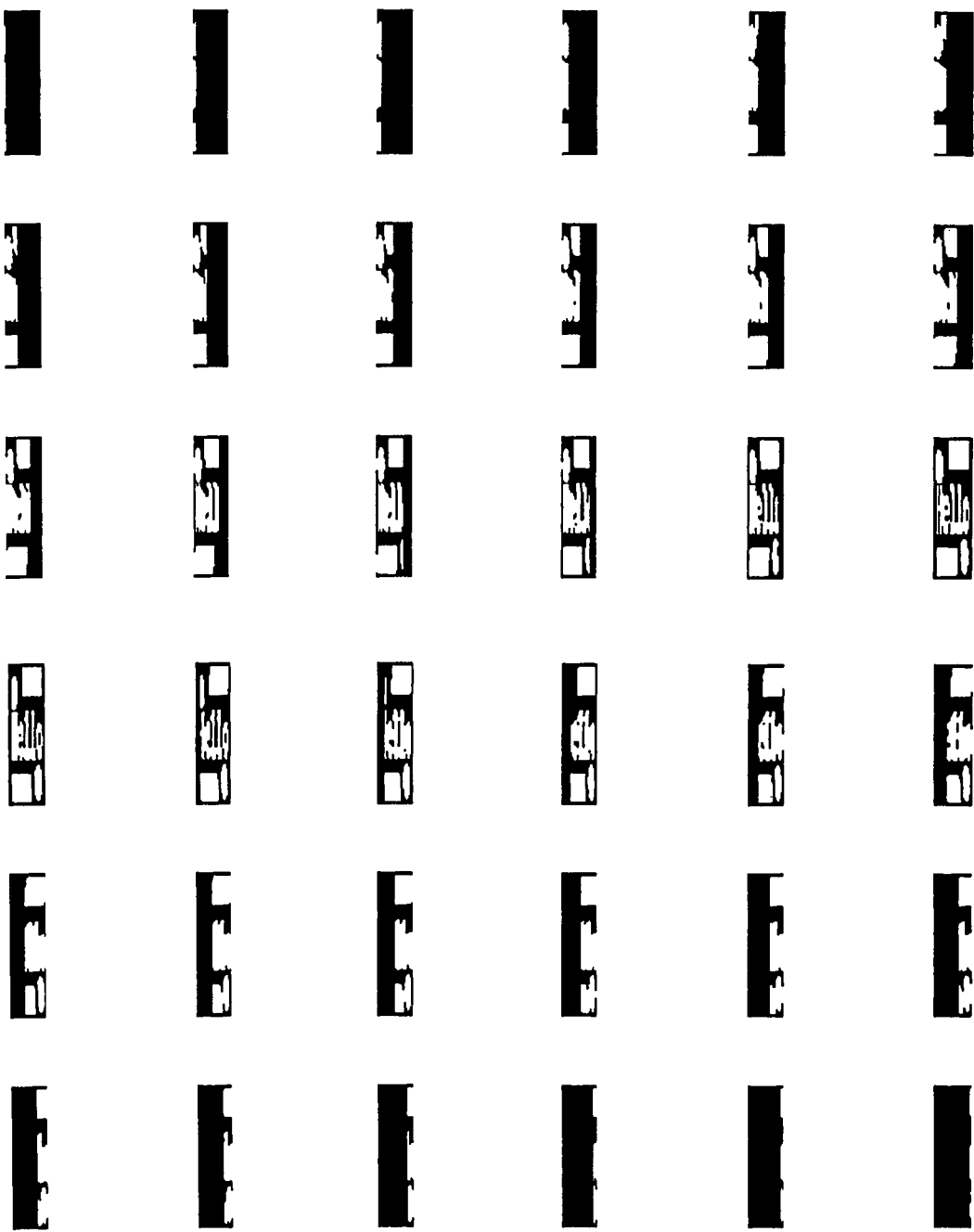
FIG. 22 is views showing projection views produced by setting a computation column range as the minimum according to the embodiment of the present invention.

Four kinds of examples of the projection method are illustrated in FIG. 21A to FIG. 21D. FIG. 21A illustrates an orthographic projection, FIG. 21B illustrates a perspective projection, FIG. 21C illustrates a vertically-perspective and horizontally-orthographic projection, and FIG. 21D illustrates a vertically-orthographic and horizontally-perspective projection. Each parallax image in this embodiment is obtained by the projection method illustrated in FIG. 21C, and FIG. 22 illustrates an example of images projected in the total 36 directions with a viewing distance of 1 m. Since images are not produced except for a required range, an unnecessary range becomes black.

Figure 18:
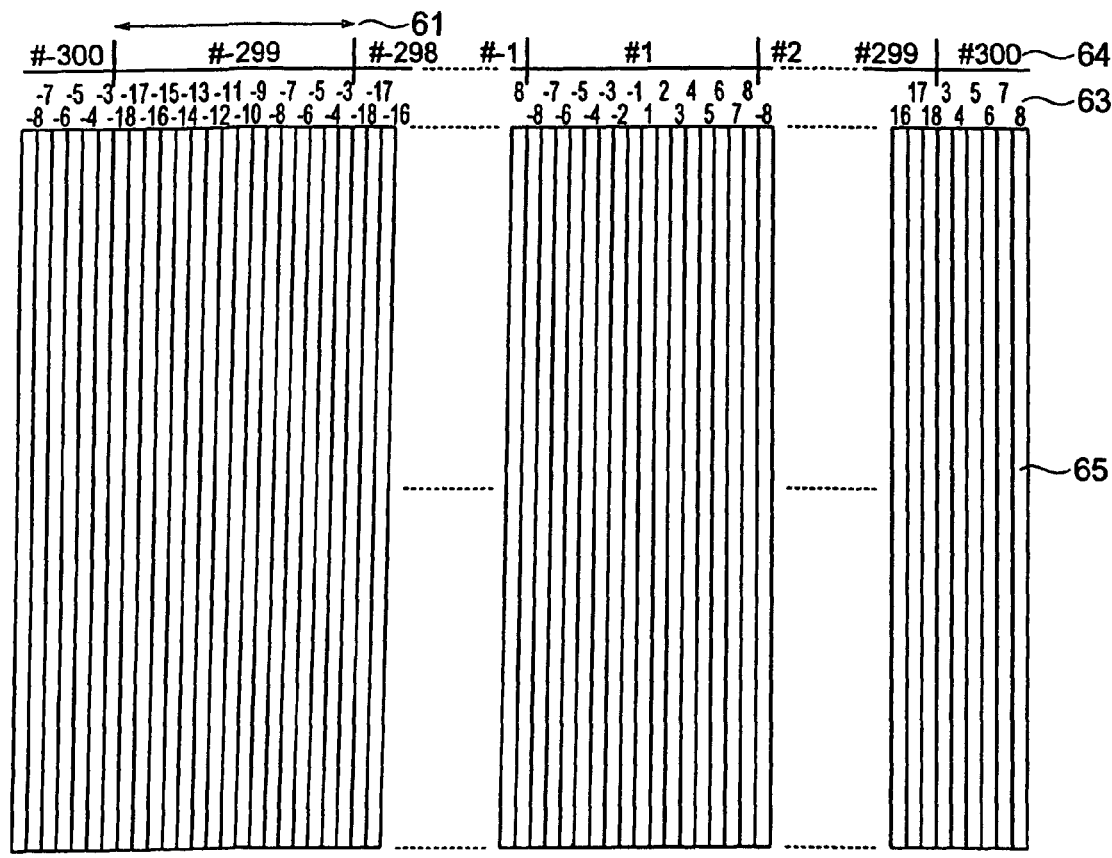
FIG. 18 is a diagram illustrating an image arrangement method of the stereoscopic display device according to the first embodiment of the present invention.
Figure 19:
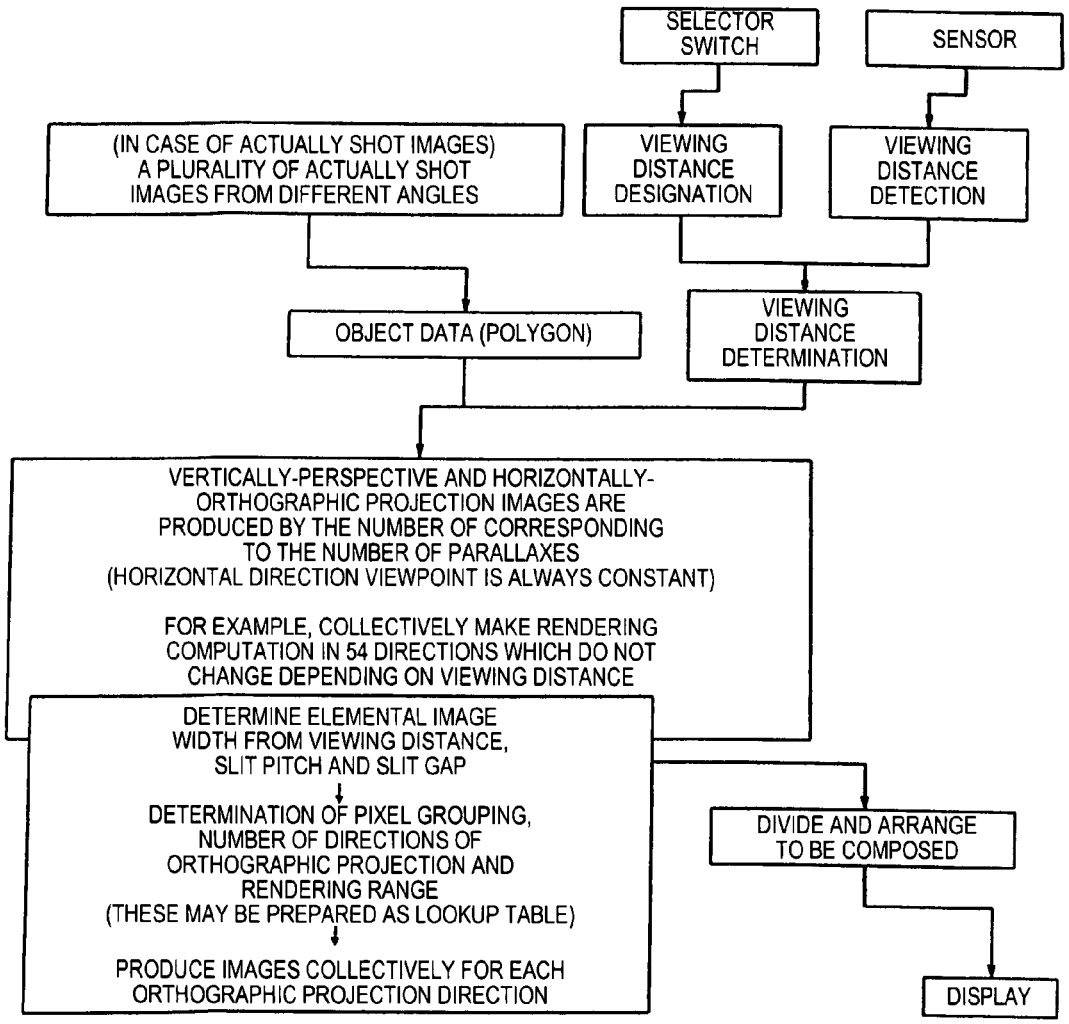
FIG. 19 is a flowchart showing a display image producing procedure according to the second embodiment.

FIG. 18 illustrates an image arrangement in a pixel plane of the display device. The pixel plane of the display device is divided into elemental images corresponding to respective apertures. Each of the elemental images in this embodiment is constituted with 16 or 17 pixel columns 65 (the elemental image width 61 is originally a number between 16 times or 17 times the pixel width, but it is set to 16 times or 17 times according to the position in order to make assignment digitally). The number of the pixel columns which allows assignment of a parallax is 9,600 columns (3,200×RGB), the number of apertures is 600 (the range of the aperture number 64 is −300 to −1 and 1 to 300), and the aperture pitch Ws is equal to the width of the pixel column of 16. In respective pixel columns 65, corresponding parallax image numbers 63 (in this example, corresponding to 36 directions of −18 to −1 and 1 to 18) are illustrated.

In FIG. 3, aperture numbers where arrangement of a parallax image in the m-th direction is started and stopped are shown. For example, in case of the viewing distance of 1 m, the $-18^{th}$ parallax image is arranged between an aperture number with a number of −299 (since an aperture number with a number of −300 and aperture numbers subsequent thereto are out of a pixel area of the display device, they are removed) and that of −297, which is illustrated in FIG. 18. That is, in the case of the viewing distance of 1 m, a parallax image with a number of −18 can be obtained by producing three columns of pixels. The elemental image with an aperture number of 1 comprises pixel columns of 16 parallaxes with parallax numbers of −8 to −1 and 1 to 8, and the elemental image with an aperture number of −299 comprises pixel columns of 16 parallaxes with parallax numbers of −18 to −3. Of course, pixel columns divided within each elemental image are arranged in the order of the parallax number. The same parallax number appears for each 16 pixel columns without any exception. Since the elemental image width 61 is slightly larger than the width of 16 pixel columns, a boundary of the elemental image is required to match with the nearest pixel column boundary (an ordinary A-D conversion), therefore the pixel column number to an aperture is 16 columns in most of apertures, but 17 columns to an aperture also appear. A parallax number range in an aperture is shifted one by one on the aperture number comprising 17 columns. The aperture numbers comprising 17 columns are the numbers of apertures positioned at both ends defining a range where an image with each parallax number is arranged, and 17 columns are defined by apertures with numbers of 16, 47, 79, 110, 141, 172, 204, 235, 266 and 297 (and their minus numbers) appearing in Start and Stop columns of Table illustrated in FIG. 3 (in case of a viewing distance of 1 m).

As described above, a horizontally-orthographic and vertically-perspective projection image which have been produced collectively for each direction within only a required range are divided and arranged for each pixel column so that a display image on the display device is produced.

Figure 20:
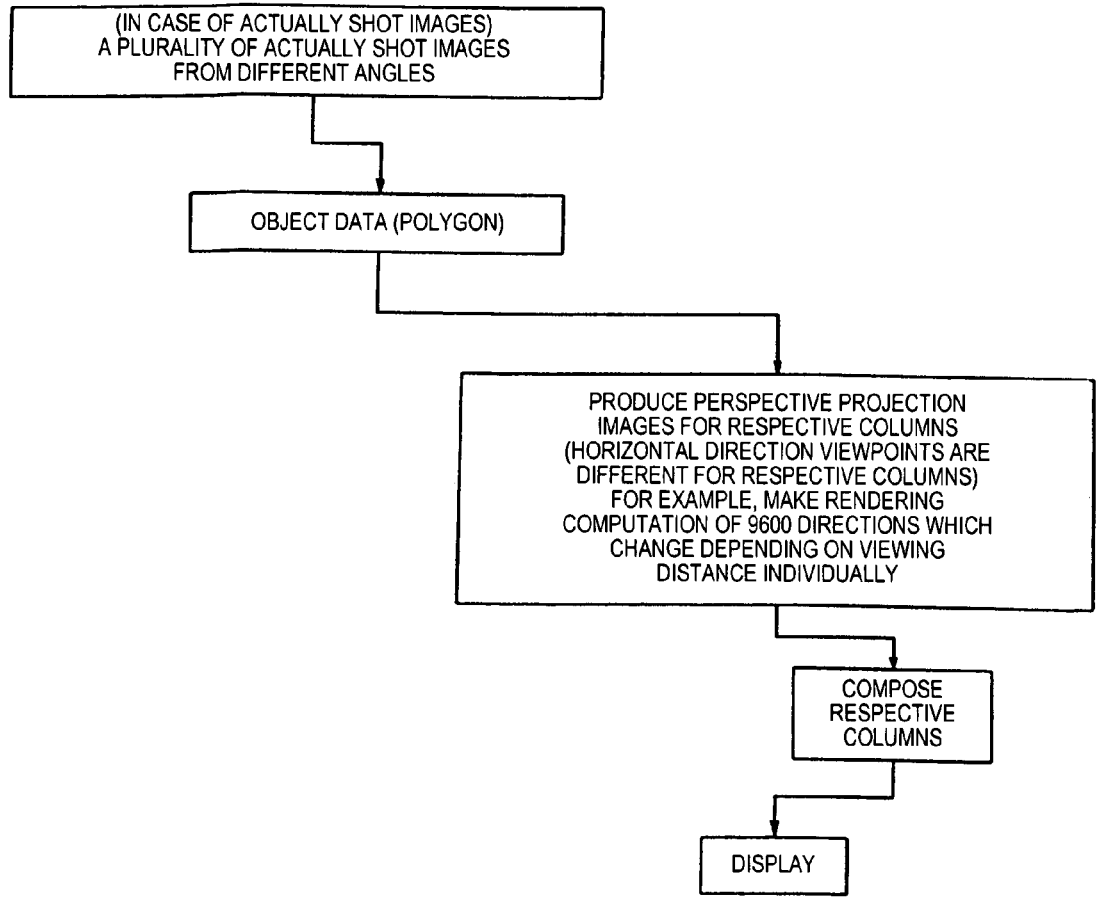
FIG. 20 is a flowchart showing a display image producing procedure according to a comparative example 1.

As a first comparative example, an ordinary one-dimensional IP system where a horizontal pitch of an aperture is not integer times a horizontal pitch of a pixel is considered. A stereoscopic display device of the first comparative example takes an image display procedure illustrated in FIG. 20. In this case, since horizontal viewpoints are different for respective columns, a perspective projection image in a different direction for each column must be produced. If the number of pixels is the same number as this embodiment, it is necessary to compute 9,600 directions individually, which results in complication in computation procedure.

As a second comparative example, an ordinary one-dimensional IP system where a horizontal pitch of an aperture is integer times a horizontal pitch of a pixel but images are produced by orthographic projections both in a vertical direction and in a horizontal direction. In this case, an image can be produced easily without necessity for determining a viewing distance, and a stereoscopic image can be made possible in broad front and rear directions according to the kind or the content of an image. However, there is a problem of distortion of the image actually produced.

Figure 8A:
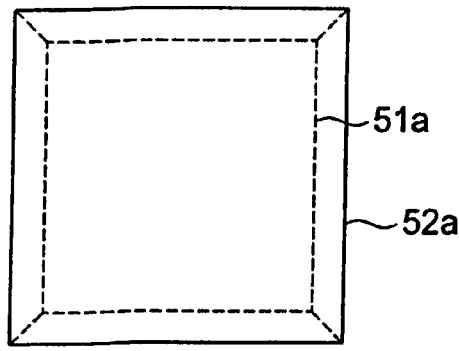
FIG. 8A is a view illustrating a frame of a cube displayed by the stereoscopic display device of the first embodiment.
Figure 8B:
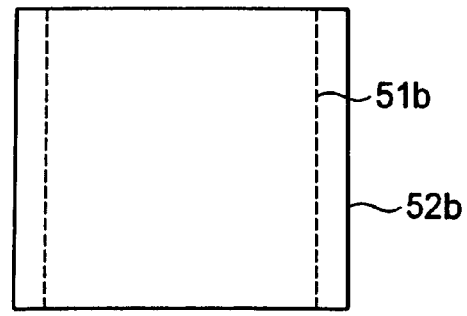
FIG. 8B is a frame of a cube displayed by a stereoscopic display device of a comparative example.
Figure 9:
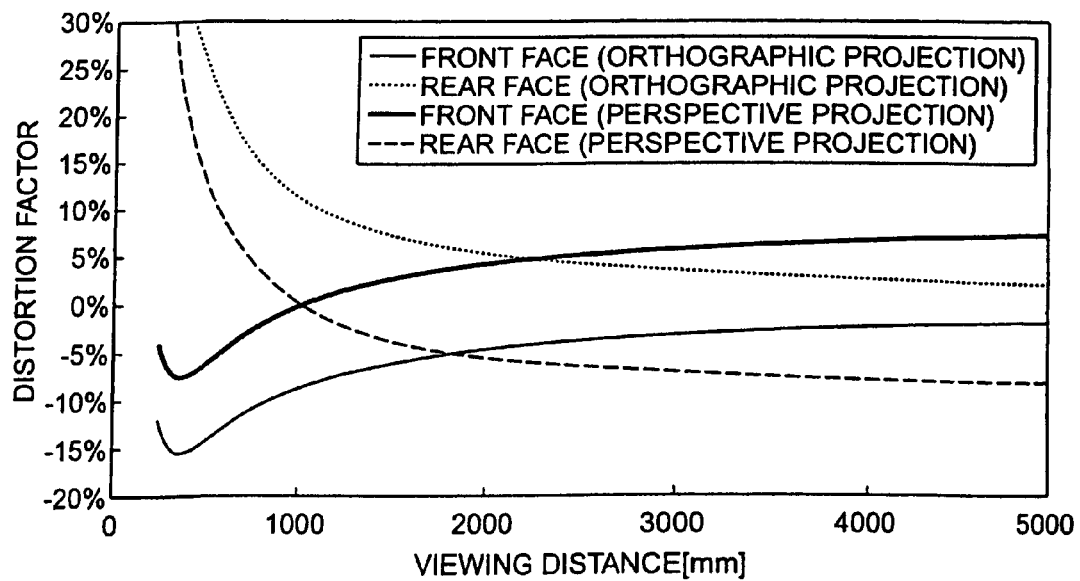
FIG. 9 is a graph showing a relationship between a distortion factor of a stereoscopic image and a viewing distance.

FIG. 8A and FIG. 8B are views which have displayed frames of a cube, FIG. 8A illustrating a frame of a cube displayed by the stereoscopic display device of this embodiment and FIG. 8B illustrating a frame of the cube displayed by the second comparative example. In the second comparative example, as illustrated in FIG. 8B, it will be understood that a face 51b on this side of the cube is spread laterally and a face 52b on the depth side thereof is narrowed laterally, so that the cube does not appear to be square and distorts largely though it is seen from its front. In this embodiment, as illustrated in FIG. 8A, a face 51a on this side of the cube and a face 52a on the depth side are displayed without any distortion, and even if the viewing distance moves slightly forward or rearward, a distortion is small. Distortion factors in the present embodiment and the second comparative example are shown in FIG. 9. As understood from FIG. 9, a distortion in a viewing distance of 1 m is 10% or more in the second comparative example, but the distortion in a viewing distance of about 1 m is suppressed to 5% or less in this embodiment.

Figure 6:
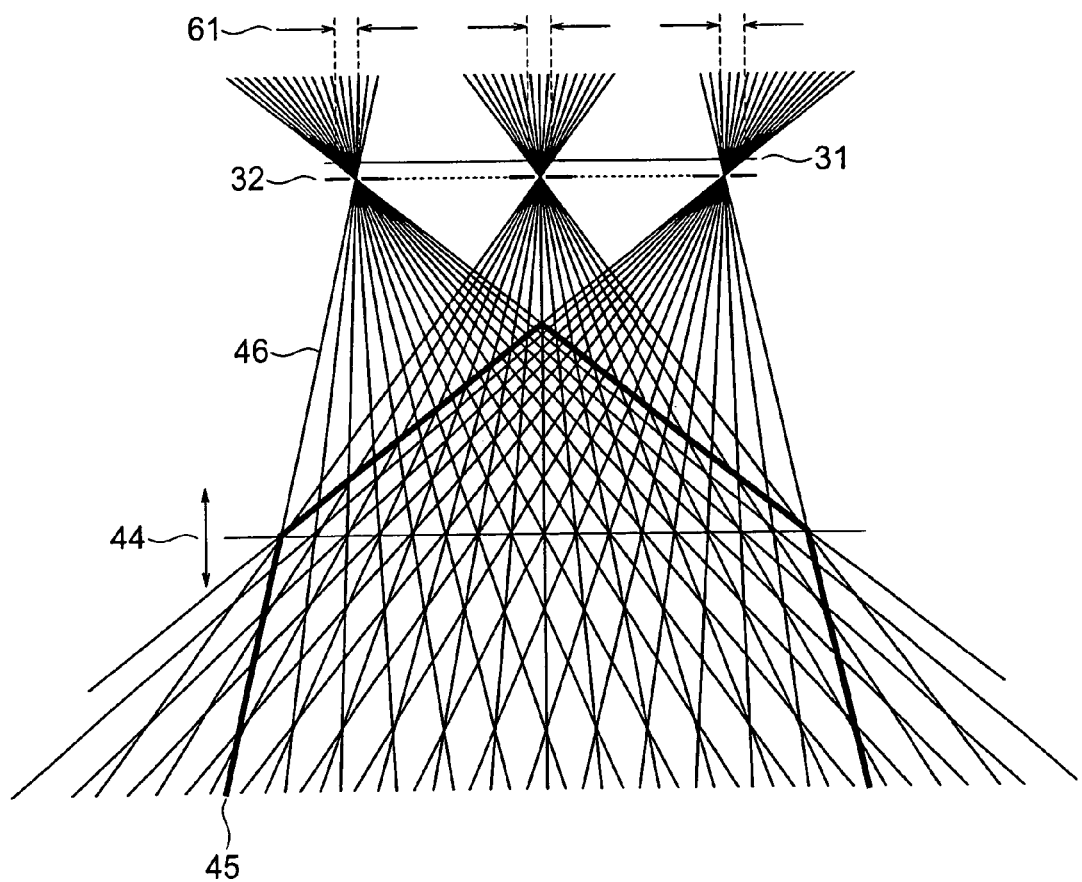
FIG. 6 is a view illustrating a viewing zone in an integral photography system.
Figure 7A:
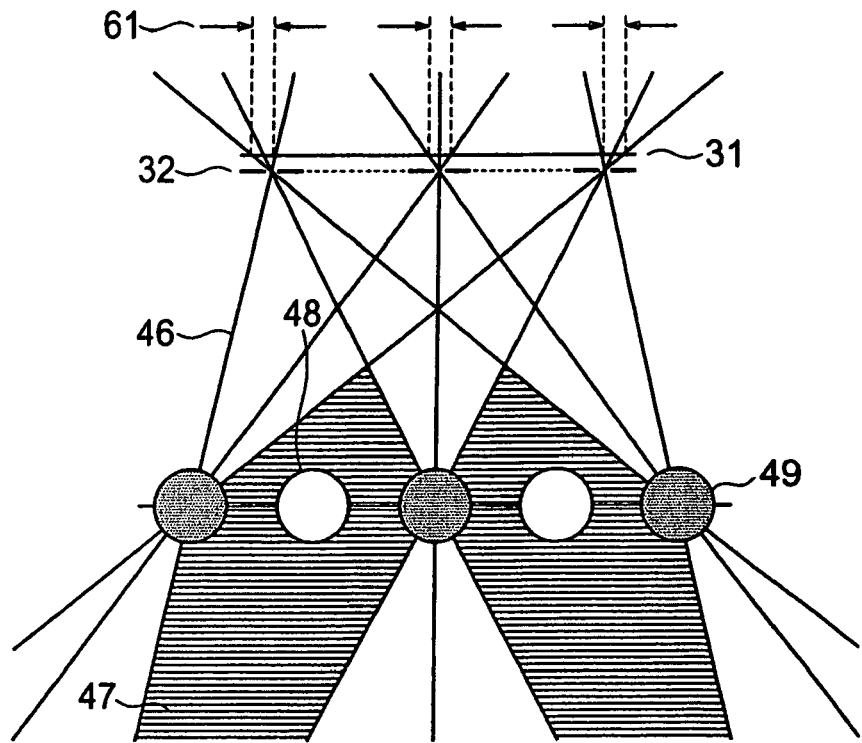
FIG. 7A is a view illustrating a viewing zone of a binocular system.
Figure 7B:
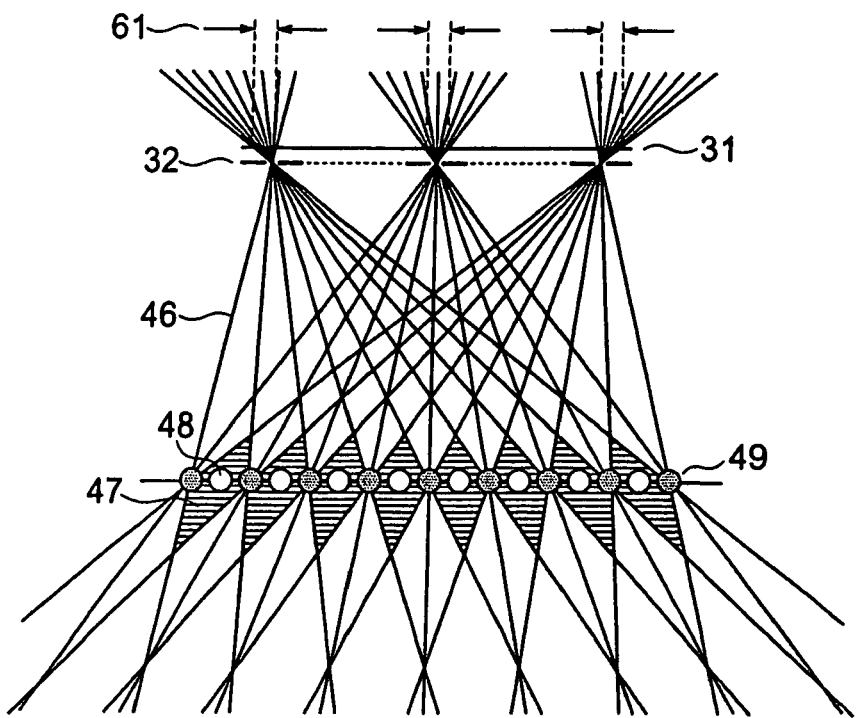
FIG. 7B is a view illustrating a viewing zone of a multiview system.

As a third comparative example, FIG. 7A illustrates a viewing zone of a binocular system and FIG. 7B illustrates a viewing zone of an eight-viewpoint system. Positions of both the eyes which allow a normal stereoscopic view are indicated by reference numeral 48. A viewing zone 47 is limited to a region indicated by a dark area and it becomes a pseudoscopic view at a position indicated by reference numeral 49. In this embodiment, as illustrated in FIG. 6, an image which hardly includes distortion is displayed continuously (without causing a pseudoscopic view) in left and right directions at a front or rear position in a range 44 within a stereoscopic view enabling range 45 which does not include a breakup image. A distortion slightly occurs in a range 45 except for the range 44 but a stereoscopic view is allowed. Incidentally, FIG. 6 is a view illustrating a viewing zone in the integral photography system. Further, in FIG. 6, FIG. 7A and FIG. 7B, reference numeral 46 denotes a line or plane crossing a viewpoint and an aperture center (which is not limited to a case that the line or plane passes through the center of a pixel), and reference numeral 61 denotes a width (pitch) of an elemental image.

The above-described results will be collectively shown in FIG. 5. As understood from FIG. 5, the stereoscopic display device of the embodiment can obtain an excellent advantage, as compared with the binocular or multiview system, or the ordinary one-dimensional IP system.

As explained above, according to the embodiment, a distortion can be reduced and a viewing zone in front or rear direction can be substantially spread even in a one-dimensional IP system, and computation method can be facilitated.

Second Embodiment

Next, a second embodiment of the present invention will be explained with reference to FIG. 1 to FIG. 19. A stereoscopic display device of the embodiment is constituted by further adding a function for inputting a viewing distance and displaying an image corresponding to the input viewing distance to the stereoscopic display device of the first embodiment. Inputting means for the viewing distance may be such a manual inputting device as a button, a knob, a software switch or the like, and it may be constituted so as to dispose the viewing distance sensor (the observer position detector) 73 on the liquid crystal panel 31 to perform automatic detection and conduct feedback of the detected data to an image to be displayed, for example, as illustrated in FIG. 4. As the viewing distance sensor 73, for example, an autofocus measuring element used in a camera can be utilized.

In this connection, besides the detection of the position of the observer, the position of a mouse can be detected in a personal computer, and the position of a remote controller may be detected in a TV set.

Figure 23:
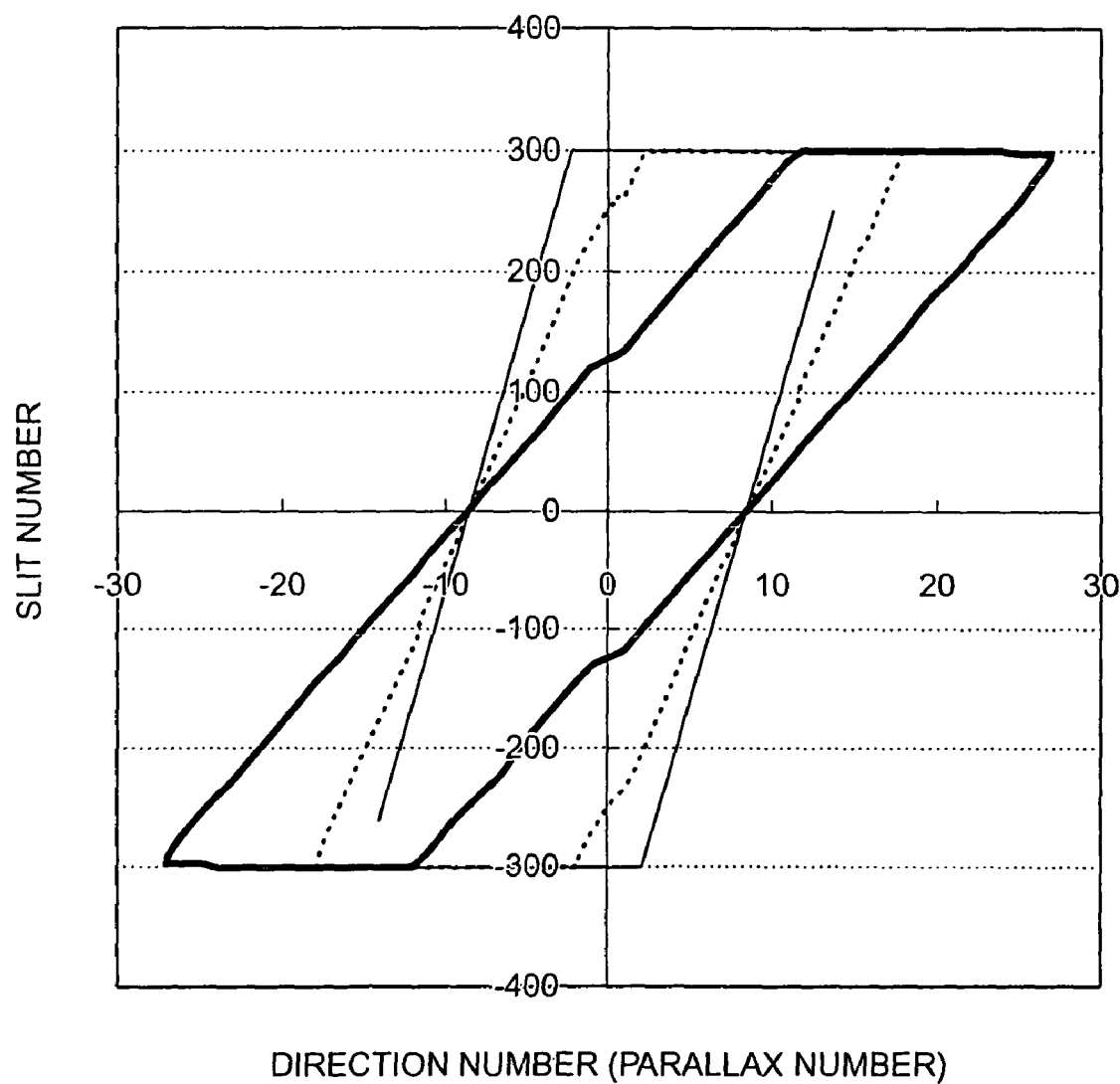
FIG. 23 is a graph showing the computation column range according to the embodiment of the present invention.

In this embodiment, for example, when the viewing distance is changed due to transfer from the viewing distance plane 43a to the viewing distance plane 43b in FIG. 1, such a change can be responded by performing switching from the elemental image width 61a to the elemental image width 61b. In the procedure illustrated in FIG. 19, when the vertically-perspective and horizontally-orthographic projection images are produced by the number corresponding to the number of parallaxes, the horizontal direction viewpoint is always fixed, so that images can be collectively computed in 54 directions which do not change due to the viewing distance, as shown in FIG. 3. FIG. 23 illustrates the computation range in FIG. 3 in a graphic form. If a total range of parallelograms to correspond to respective viewing distances is always set as the computation range, it becomes unnecessary to change the computation range due to change in viewing distance.

On the other hand, in case that change in viewing distance is accommodated in the first comparative example to the first embodiment, it is necessary to compute 9,600 directions changed due to change in viewing distance individually, which results in increase in computation amount.

In this embodiment, a range 44 with a small distortion in FIG. 6 moves forward or rearward according to the viewing distance, so that a state which hardly includes distortion is always maintained. In this connection, in FIG. 6, reference numeral 45 denotes a stereoscopic view enabling range which does not include a breakup image, reference numeral 46 denotes a line or a plane connecting a viewpoint and an aperture (which does not pass through the pixel center necessarily), and reference numeral 61 denotes an elemental image width (pitch).

A stereoscopic image of perspective projection with no distortion or with reduced distortion is always displayed by changing the elemental image width according to change in viewing distance and simultaneously changing a perspective projection image in a vertical direction. Images with different viewing distances are prepared in advance, or they are produced by real-time computation.

Such a constitution can be employed that the elemental image width is changed according to change in viewing distance and simultaneously an image is enlarged/reduced. In this case, since re-computation where a viewing distance of the perspective projection has been changed is not required, such a constitution is convenient on the processing. However, there is a drawback that a stereoscopic object appears to have the same size even if the viewing distance is changed.

Alternatively, such a constitution can be employed that the elemental image width is changed by performing stepwise switching among fixed viewing distances without performing continuous adjustment according to change in viewing distance. For example, switching among three steps of viewing distances of 500 mm, 1,000 mm and 1,500 mm illustrated in FIG. 3 is performed. In this case, such a constitution can be adopted that the elemental image widths are switched according to change in viewing distance and simultaneously the image is enlarged/reduced. Alternatively, such a constitution can be employed that perspective projection images with different viewing distances only in a vertical direction are changed according to a viewing distance change within a fixed range where the elemental image widths are not switched.

A general method of perspective transformation has been described, for example, in "THREE-DIMENSIONAL DISPLAY" (written by Chihiro MASUDA; published by SANGYO TOSHO, 1990) (refer to Chapter 4). In this embodiment, the perspective transformation is performed only in a horizontal direction. As an advantage, an image which does not include a breakup image or a distortion can be obtained in any viewing distance, and this embodiment is specifically effective for application where any distortion is not allowed, such as a medical application, a design application or the like.

Third Embodiment

Figure 13:
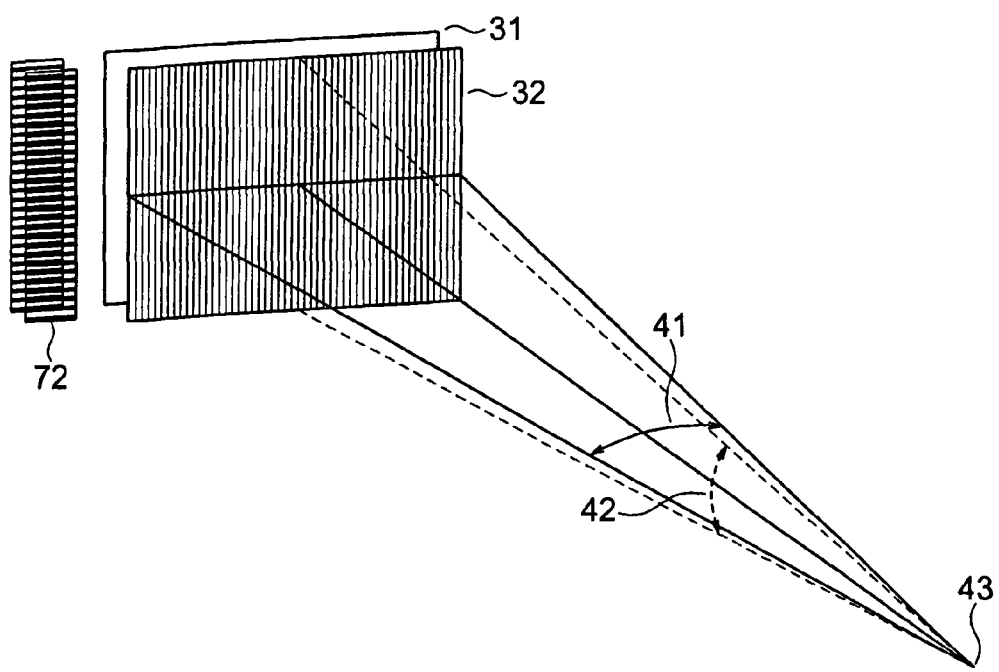
FIG. 13 is a view illustrating an out-of-viewing zone alarming function of an indicator of a stereoscopic display device according to a third embodiment of the present invention.

A third embodiment of the present invention will be explained with reference to FIG. 13 to FIG. 15. A stereoscopic display device of this embodiment is constituted by providing a vertical direction indicator 72 which can detect that a viewpoint 43 of an observer is positioned out of a viewing zone in up and down directions and in front and rear directions in a stereoscopic display device of a one-dimensional integral photography system, as illustrated in FIG. 13. That is, the stereoscopic display device of the embodiment is provided with an alarming function which detects such a fact that the viewpoint 43 of the observer is positioned out of the viewing zone in up and down directions and in front and rear directions and outputs alarm. Incidentally, FIG. 13 is a view illustrating a constitution of the stereoscopic display device provided with the vertical direction indicator according to the embodiment. In this connection, in FIG. 13, reference numeral 41 denotes a horizontal viewing angle and reference numeral 42 denotes a vertical viewing angle.

Figure 14A:
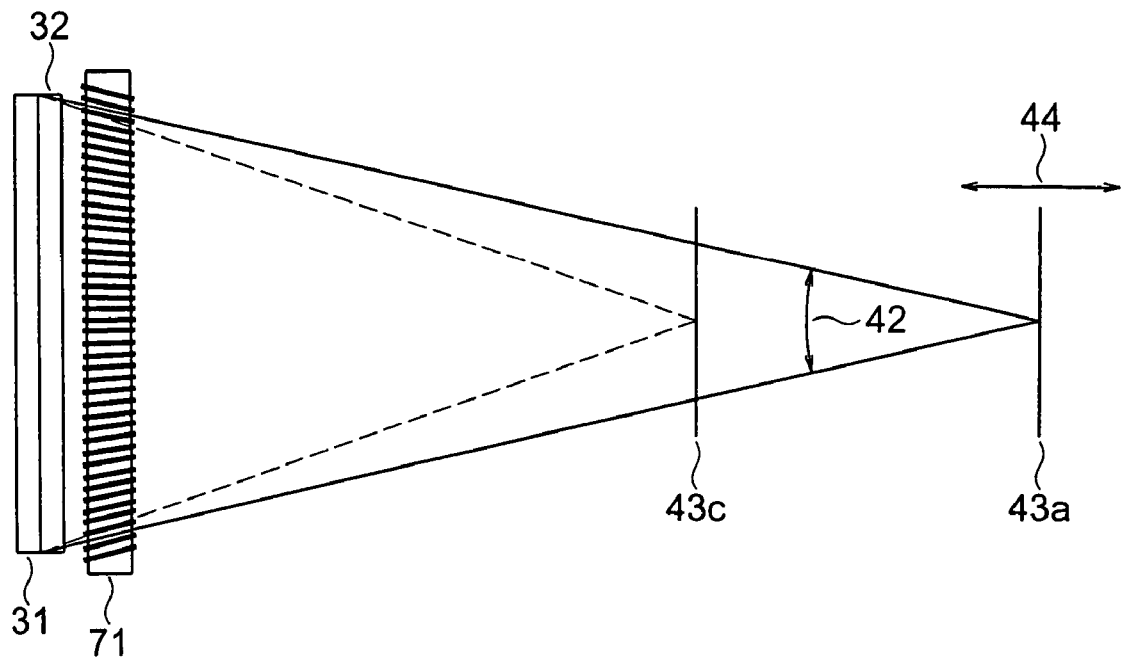
FIG. 14A is a plan view of a stereoscopic display device according to a modified embodiment of the third embodiment of the present invention.
Figure 14B:
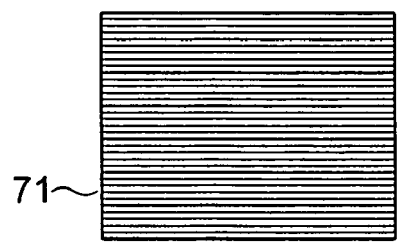
FIG. 14B is a front view illustrating an out-of-viewing zone alarming function according to a blind structure of the stereoscopic display device according to the modified embodiment of the third embodiment.
Figure 15A:
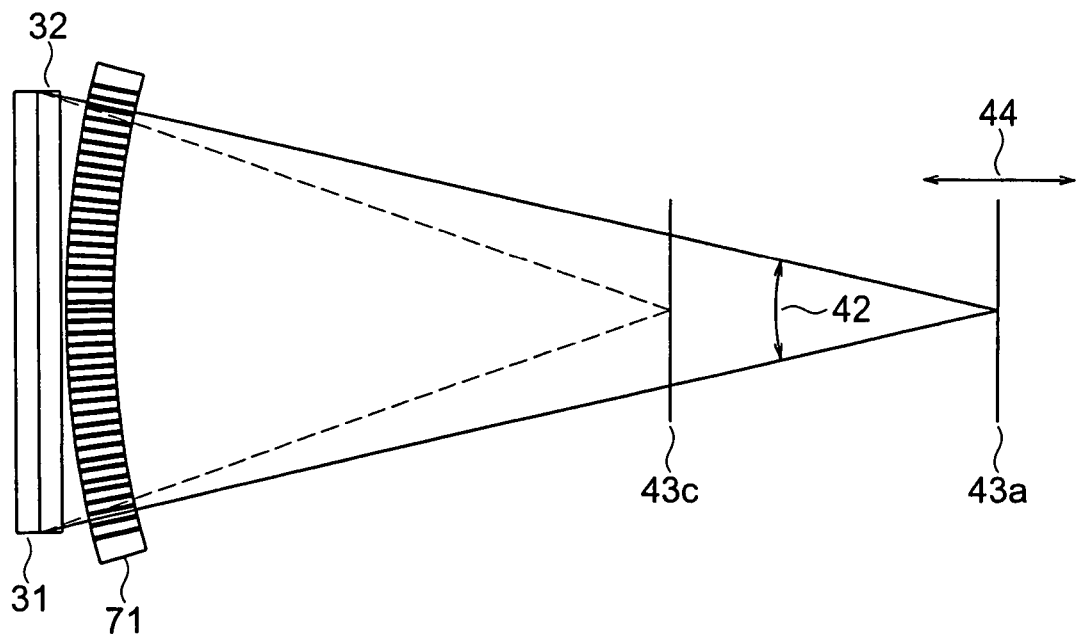
FIG. 15A is a plan view illustrating the stereoscopic display device according to another modified embodiment of the third embodiment of the present invention.
Figure 15B:
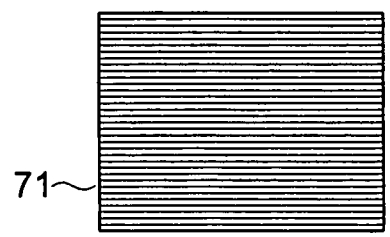
FIG. 15B is a front view illustrating an out-of-viewing zone alarming function according to a blind structure of the stereoscopic display device according to the another modified embodiment of the third embodiment.

Further, an out-of-viewing zone alarming function 71 having such a blind structure as illustrated in FIGS. 14A, 14B, 15A and 15B may be provided. In FIGS. 14A and 15A, reference numeral 42 denotes a vertical direction viewing angle, reference numeral 43a denotes a viewing distance plane, reference numeral 43c denotes a viewing distance plane out of a normal viewing distance with no distortion (or with reduced distortion), and reference numeral 44 denotes a normal viewing distance with no distortion (or with reduced distortion). Incidentally, FIG. 14A is a side view of a stereoscopic display device provided with an out-of-viewing zone alarming function 71 having a blind structure, and FIG. 14B is a front view of the out-of-viewing zone alarming function 71 having the blind structure. FIG. 15A is a side view of a stereoscopic display device provided with another out-of-viewing zone alarming function 71 having a blind structure, and FIG. 15B is a front view of the out-of-viewing zone alarming function 71 having the blind structure. In this connection, in FIGS. 15A and 15B, the out-of-viewing zone alarming function 71 is formed in a concave curved shape to an observer.

As illustrated in FIG. 14B and FIG. 15B, both the vertical direction indicator 72 and the blind structure 71 have a cyclic structure in a vertical direction. The indicator 72 is designed such that its indication appears with different colors or brightnesses or different messages are respectively displayed in a normal viewing zone and out of the range. In the case, for example, the indicator 72 may be constituted by overlapping two sheets of forming patterns in front and rear. The blind structure 71 is formed along a direction of perspective projection radially only in a vertical direction. There is a case that the blind structure having the curved shape illustrated in FIG. 15A is easier in manufacture than the blind structure illustrated in FIG. 14A. Thereby, an advantage that alarming is given or an image disappears when the image is distorted can be obtained easily, and this embodiment is specifically effective for application where any distortion is not allowed, such as a medical application, a design application or the like.

In this connection, the out-of-viewing zone alarming function explained in the third embodiment may be provided in the first embodiment.

Fourth Embodiment

Figure 16:
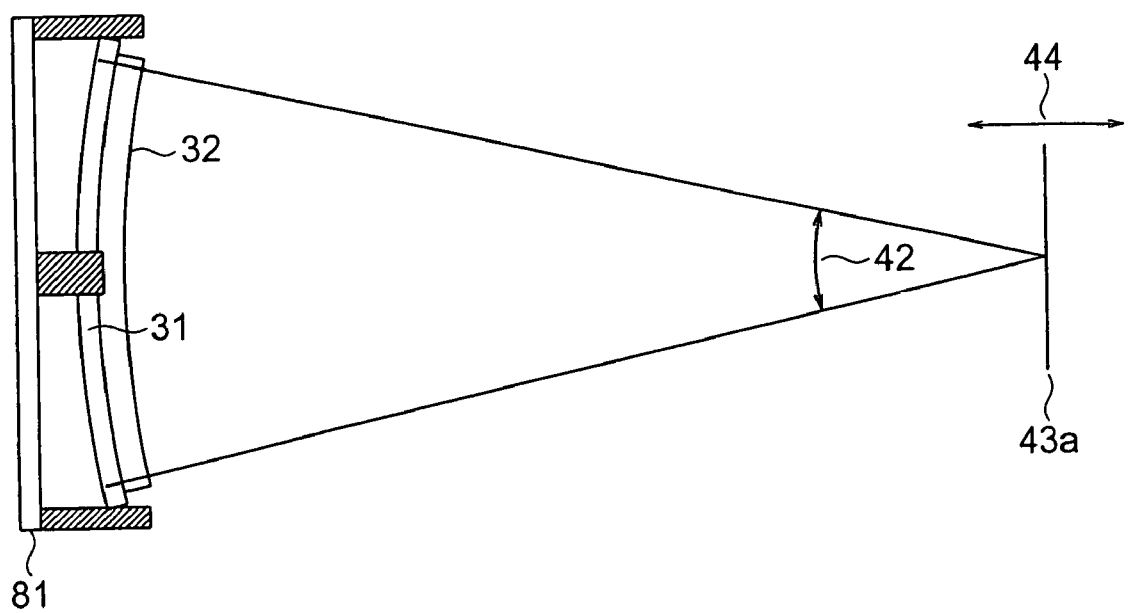
FIG. 16 is a view illustrating a stereoscopic display device provided with a display face curved in a vertical direction according to another modified embodiment of a fourth embodiment of the present invention.

A fourth embodiment of the invention will be explained with reference to FIG. 16. A stereoscopic display device of this embodiment is constituted such that a display plane of a display unit 31 including a parallax barrier 32 is curved in a vertical direction, and a stereoscopic image of perspective projection is displayed by displaying a vertical direction perspective projection image, where the center point determined from the radius of curvature is defined as a viewing distance position 43a. In this connection, in FIG. 16, reference numeral 42 denotes a vertical direction viewing angle and reference numeral 44 denotes a normal viewing distance with no distortion (or with reduced distortion).

In this embodiment, further, a curvature changing mechanism 81 which changes the curvature of the display plane may be provided. Incidentally, when the viewing distance varies, distortion can not be corrected by only changing the curvature. In such a case, therefore, it is necessary to provide a display image adjustment similar to the one described in the second embodiment. The display device 31 with a curve face can be made by grinding a glass plate of an assembled liquid crystal display device to make it thinner.

As explained above, according to this embodiment, a perspective projection image with reduced distortion can be obtained.

This embodiment is effective as assistant means for suppressing distortion in case of a large screen.

Though the present invention has been explained through the respective embodiments with reference to the drawings, the present invention is not limited to these embodiments. The present invention can be implemented in variously modified modes within the scope and spirit of the invention.

As described above, according to the embodiments of the present invention, a perspective projection image with reduced distortion can be obtained.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concepts as defined by the appended claims and their equivalents.

What is claimed is:

1. A stereoscopic display device of a one-dimensional integral photography system, comprising:
a display unit including a display plane in which pixels are arranged flatly in a matrix shape;
a parallax barrier including a plurality of apertures or a plurality of lenses and being configured to control directions of rays from the pixels such that a horizontal disparity is included but a vertical disparity is not included; and a viewing distance adjusting mechanism which changes a vertical direction perspective projection image according to change in viewing distance, the display plane of the display unit being divided so as to correspond to elemental images for respective apertures or the lenses of the parallax barrier.

2. A stereoscopic display device of a one-dimensional integral photography system according to claim 1, wherein a horizontal direction pitch of the parallax barrier is integer times a horizontal pitch of the pixels, and an image which has been subjected to a perspective projection defined by the viewing distance in a vertical direction and which has been subjected to an orthographic projection in a horizontal direction is divided and arranged for respective pixel columns.

3. A stereoscopic display device of a one-dimensional integral photography system according to claim 2, wherein the viewing distance adjusting function charges the width of the elemental image according to change in viewing distance and simultaneously enlarges/reduces the perspective projection image.

4. A stereoscopic display device of a one-dimensional integral photography system according to claim 2, wherein the viewing distance adjusting function changes the width of the elemental image by performing stepwise switching among fixed viewing distances.

5. A stereoscopic display device of a one-dimensional integral photography system according to claim 4, wherein the viewing distance adjusting function changes the width of the elemental image according to change in viewing distance and simultaneously enlarges/reduces the perspective projection image.

6. A stereoscopic display device of a one-dimensional integral photography system according to claim 4, wherein the viewing distance adjusting function changes the perspective projection image in a different viewing distance only in a vertical direction according to change in viewing distance within a constant range where the width of the elemental image is not changed.

7. A stereoscopic display device of a one-dimensional integral photography system according to claim 1, further comprising a detecting mechanism which detects an out-of-viewing zone to the display plane in up and down or front and rear directions.

8. A stereoscopic display device of a one-dimensional integral photography system according to claim 7, wherein the detecting mechanism is a vertical direction indicator.

9. A stereoscopic display device of a one-dimensional integral photography system according to claim 8, wherein the vertical direction indicator has a cyclic structure in a vertical direction.

10. A stereoscopic display device of a one-dimensional integral photography system according to claim 7, wherein the detecting mechanism has a blind structure.

11. A stereoscopic display device of a one-dimensional integral photography system according to claim 10, wherein the blind structure has a curved shape.

12. A stereoscopic display device of a one-dimensional integral photography system, comprising:

a display unit including a display plane in which pixels are arranged flatly in a matrix shape;

a parallax barrier including a plurality of apertures or a plurality of lenses and being configured to control directions of rays from the pixels such that a horizontal disparity is included but a vertical disparity is not included; and a detecting mechanism configured to detect an out-of-viewing zone to the display plane in up and down or front and rear directions, the display plane of the display unit being divided so as to correspond to elemental images for respective apertures or the lenses of the parallax barrier.

13. A stereoscopic display device of a one-dimensional integral photography system according to claim 12, wherein the detecting mechanism is a vertical direction indicator.

14. A stereoscopic display device of a one-dimensional integral photography system according to claim 13, wherein the vertical direction indicator has a cyclic structure in a vertical direction.

15. A stereoscopic display device of a one-dimensional integral photography system according to claim 12, wherein the detecting mechanism has a blind structure.

16. A stereoscopic display device of a one-dimensional integral photography system according to claim 15, wherein the blind structure has a curved shape.

17. A stereoscopic display device of a one-dimensional integral photography system according to claim 15, wherein the blind structure has a cyclic structure in a vertical direction.

18. A stereoscopic display device of a one-dimensional integral photography system, comprising:

a display unit including a display plane in which pixels are arranged flatly in a matrix shape; and a parallax barrier including a plurality of apertures or a plurality of lenses and being configured to control directions of rays from the pixels such that a horizontal disparity is included but a vertical disparity is not included, the display plane of the display unit being divided so as to correspond to elemental images for respective apertures or the lenses of the parallax barrier, and the display plane of the display unit being formed in a shape of a curved face in a vertical direction, and a perspective projection image in a vertical direction where the center point determined from the radius of curvature of the curved face is defined as a viewing distance position being displayed on the display plane.

19. A stereoscopic display device of a one-dimensional integral photography system according to claim 18, further comprising a curvature changing mechanism which changes the curvature of the display plane.

20. A stereoscopic display device of a one-dimensional integral photography system according to claim 18, further comprising a detecting mechanism which detects an out-of-viewing zone to the display plane in up and down or front and rear directions.

21. A stereoscopic display device of a one-dimensional integral photography system according to claim 20, wherein the detecting mechanism is a vertical direction indicator.

22. A stereoscopic display device of a one-dimensional integral photography system according to claim 21, wherein the vertical direction indicator has a cyclic structure in a vertical direction.

23. A stereoscopic display device of a one-dimensional integral photography system according to claim 22, wherein the detecting mechanism has a blind structure.

24. A stereoscopic display device of a one-dimensional integral photography system according to claim 23, wherein the blind structure has a curved shape.

* * * * *